United States Patent
Hueter et al.

(10) Patent No.: US 9,916,611 B2
(45) Date of Patent: Mar. 13, 2018

(54) SYSTEM AND METHOD FOR COLLECTING AND TARGETING VISITOR BEHAVIOR

(75) Inventors: Geoffrey J. Hueter, San Diego, CA (US); Steven C. Quandt, Encinitas, CA (US); Noble H. Hueter, San Diego, CA (US); Meyar Sheik, Del Mar, CA (US)

(73) Assignee: Certona Corporation, San Diego, CA (US)

( * ) Notice: Subject to any disclaimer, the term of this patent is extended or adjusted under 35 U.S.C. 154(b) by 577 days.

(21) Appl. No.: 12/416,005

(22) Filed: Mar. 31, 2009

(65) Prior Publication Data

US 2009/0248494 A1    Oct. 1, 2009

Related U.S. Application Data

(60) Provisional application No. 61/041,447, filed on Apr. 1, 2008.

(51) Int. Cl.
*G06Q 30/00* (2012.01)
*G06Q 30/06* (2012.01)
(Continued)

(52) U.S. Cl.
CPC ......... *G06Q 30/0631* (2013.01); *G06Q 10/00* (2013.01); *G06Q 30/00* (2013.01);
(Continued)

(58) Field of Classification Search
CPC ............. G06Q 30/02; G06Q 30/0201; G06Q 30/0204; G06Q 30/0251; G06Q 30/0241;
(Continued)

(56) References Cited

U.S. PATENT DOCUMENTS

| | | | |
|---|---|---|---|
| 2002/0178057 A1* | 11/2002 | Bertram | G06Q 30/02 705/14.23 |
| 2003/0110056 A1* | 6/2003 | Berghofer | G06Q 30/02 705/1.1 |

(Continued)

OTHER PUBLICATIONS

Cho, Yoon Ho, and Jae Kyeong Kim. "Application of Web usage mining and product taxonomy to collaborative recommendations in e-Commerce." Expert Systems with Applications, vol. 26, No. 2, 2004, pp. 233-246.*

*Primary Examiner* — William S Brockington, III
(74) *Attorney, Agent, or Firm* — Knobbe Martens Olson & Bear LLP

(57) ABSTRACT

A system and method is disclosed for collecting website visitor activity for profiling visitor interests and dynamically modifying the content of the website to better match the visitor's profile. The visitor activity data is collected directly from the visitor's client browser or from the website's own web log information. The collected data consists of the page identifier, page links, and the previous page identifier. Similarly, the modified page content can be sent directly to the client browser or can be sent back to the website server for integration with the other page content. The collected data is stored in a database. Based on the amount of information collected on the visitor and the various items that are presented on the website, the visitors and items are profiled so that a visitor's response to other items can be predicted and recommended to the visitor. The recommendations can be requested and displayed directly by and to the client browser or the website server can make the request and subsequently display the matching content. The system has application in personalization, behavioral targeting, Internet retailing, social networking, affiliate marketing, and online advertising, to name but a few applications.

24 Claims, 20 Drawing Sheets

(51) Int. Cl.
  *G06Q 10/00* (2012.01)
  *G06Q 30/02* (2012.01)
  *G06N 99/00* (2010.01)
  *H04L 12/58* (2006.01)

(52) U.S. Cl.
  CPC ..... *G06Q 30/0201* (2013.01); *G06Q 30/0202* (2013.01); *G06Q 30/0255* (2013.01); *G06Q 30/0269* (2013.01); *G06N 99/005* (2013.01); *G06Q 30/0185* (2013.01); *H04L 51/12* (2013.01)

(58) Field of Classification Search
  CPC ........... G06Q 30/0255; G06Q 30/0256; G06Q 30/0269; G06Q 30/0271; G06Q 30/0631
  See application file for complete search history.

(56) References Cited

U.S. PATENT DOCUMENTS

| | | | |
|---|---|---|---|
| 2004/0054572 A1* | 3/2004 | Oldale et al. | 705/10 |
| 2005/0125307 A1* | 6/2005 | Hunt | G06Q 30/02 705/26.61 |
| 2006/0026048 A1* | 2/2006 | Kolawa et al. | 705/7 |
| 2007/0204308 A1* | 8/2007 | Nicholas et al. | 725/86 |
| 2009/0083126 A1* | 3/2009 | Koren et al. | 705/10 |

\* cited by examiner

SYSTEM AND METHOD FOR COLLECTING AND TARGETING VISITOR BEHAVIOR

FIELD OF THE INVENTION

The present invention relates to electronically marketing goods, services, content, and other entities through the automated analysis of human behavior. Particularly, the invention relates to the representation of subject and object characteristics for purposes of efficient generation of recommendations; cross marketing between product, service, and content categories; and self-categorization of products by aesthetic or behavioral similarity. The system has application in personalization, behavioral targeting, Internet retailing, social networking, affiliate marketing, and online advertising, to name but a few applications.

BACKGROUND OF THE INVENTION

The consumer faces a profound number of possible choices when selecting most kinds of products, be it movies, music, books, travel, art, dining, employers, and so on, to the extent that the consumer must choose from well-publicized possibilities, such as through advertising, or rely on recommendations of others. In the first case the set of choices is severely limited to those that can be promoted to a broad audience. In the second case the consumer must weigh the similarity of his or her own tastes to the person making the recommendation, whether it be an acquaintance or media. In addition, the number of possibilities and the cost of acquisition, both in terms of time and money, of assessing possibilities, make it infeasible to sample a large number of possibilities to determine which are of interest to the consumer.

Recommendation systems rely on trying to best match a person's individual preferences to the characteristics of the available items. In general what is known about the subjects and objects is the set of affinities between subjects and objects, where the affinity $\{A_{ij}\}$ between subject i and object j is determined by explicit feedback from the subject or inferred from the subject's interaction (or non-interaction) with the object. The consistency of the affinity scale from subject to subject and object to object derives from the consistency of the goal of the subjects in the given environment, for example to make a purchase in a commerce environment or to read articles in a content environment.

The primary goal of the recommendation system is to predict for a given subject those objects for which the subject will have the greatest affinity. In general the subject characteristics can be represented by a vector $S=(S_1, S_2, \ldots, S_L)$ and the object characteristics can be represented by a vector $B=(B_1, B_2, \ldots, B_M)$, whereby the predicted affinity of the subject to the object is a function $P=f(S, B)$. Various recommendation systems then differ in their representation of subject and object characteristics S and B and the similarity function f.

One method that has been used, commonly referred to as collaborative filtering, is to represent the subject as the set of object ratings that the subject has provided; i.e., $S=\{R_1, R_2, \ldots, R_L\}$, where $R_i$ is the subject's rating of object i. In most scenarios where recommendations are of use, the number of available items (e.g., such as catalog size) is going to be much larger than the number of items that have been rated by the subject, and so the set S is sparse. To generate a recommendation of a particular object to a particular subject, the subject's profile is compared to the profiles of other subjects that have rated the object. Given the similarities and dissimilarities of objects that have been rated in common, an estimate of the subject's response is generated. In a recommendation system, the system would generate estimates for a variety of objects rated by similar people and return as recommendations the objects with the highest predicted ratings.

Effectively, this type of system is a "mentored" system, whereby each subject is matched to a set of other subjects with similar tastes that have rated objects that the subject has not rated. This approach has several drawbacks, which include: recommendations can only be made where the subject's small set of mentors have provided coverage; the method is dependent on a class of users that have provided a large number of ratings (i.e., mentors), or else the system database must be searched to provide mentors appropriate to each requested object; the method is limited in capacity to make recommendations across various categories (cross marketing); the method does not make full use of all data for each subject (that is, the method is restricted to the subset of mentors); the representation of the subject, which is the set of ratings for each rated object, is not compact and increases linearly with the number of rated objects; subject representations are not portable to other recommendation systems; requires lengthy questionnaires to introduce a new subject into the system; and faces combinatorial challenges to find the best mentor for a given user and is therefore not scalable to large user populations.

Additional desired characteristics of a recommendation system that cannot be addressed by the mentor method include inverse modeling of subject representations back to physical attributes, such as demographics or psychographics, and identification and representation of object similarities.

Another approach is shopping basket analysis, which makes suggestions based on objects that have been purchased by other subjects at the same time as an object that has been selected by the targeted subject. However, this approach relies on transactional dependency and does not allow prediction of preference for objects that are not purchased together. In particular this method cannot associate subject/object affinities across catalog or across time as catalog items are replaced by similar items. Shopping basket analysis is also not specific to individual subjects, but rather to aggregate transaction histories across all subjects. By contrast, the present invention automatically normalizes all product profiles across product categories and can combine information across single vendor transaction histories.

Other approaches classify objects according to expert defined categories or attributes, whereby each object is rated by each attribute and then recommendations are made by matching the expressed interests of the subject to the attributes of the objects. Expert systems have the drawback that they are not self-adapting; that is, they require expert classification or coding. This means that such systems are specific to a single product domain. Also, because they are not data driven, they are not able to process large, diverse, and constantly changing transaction histories.

Predictive modeling techniques use demographics to model subjects. Not only are demographics an indirect substitute for aesthetic opinions and therefore inherently inaccurate, this is invasive of the subject's privacy and only specific to groups of subjects and not to individual subjects.

SUMMARY OF THE INVENTION

In accordance with the present invention, a method and system is presented for collecting subjects' affinities to objects, extracting subject and object profiles, and generating recommendations to subjects of objects that were rated by other subjects. This invention is sometimes referred to in this patent by its commercial trademarked name, Resonance®.

An object of the invention is to provide a means of recommending objects to subjects based on either explicit or behaviorally inferred ratings of other subjects of those objects and of commonly rated objects.

Another object of the invention is to compactly and uniformly represent subject and object profiles so that the affinity, or preference, of the subject to the object can be quickly and efficiently predicted, and so that the number of features in the profiles of the subjects and objects is not directly dependent on the number of subjects or objects in the system.

Another object of the invention is to create a representation of objects that is universal across all types of objects, so that all types of objects can be compared to one another and the subject's interaction with one set of objects can be extrapolated to other types of objects, and that the representation is derived solely from the collective interaction of subjects with the set of objects (catalog) and does not require detailed object information or expert knowledge of object characteristics.

Another object of the invention is to enable the use of all subject-object interactions, and not just, for example, purchase behavior, to form profiles of subject and objects for faster profiling and greater accuracy and responsiveness to temporal changes in site merchandising or customer behavior.

Another object of the invention is to create object profiles as well as subject profiles, so that objects can be readily indexed by aesthetic or other categories and so that objects can be readily associated across product categories by aesthetic similarity.

Another object of the invention is to create subject and object profiles that can be used to relate the derived aesthetic attributes to other objective measures of subjects, such as personality type or demographics, and objects, such as color or shape.

Another object of the invention is to collect ratings information from multiple applications while protecting the anonymity of the subject across different applications and minimizing the need to normalize object information (metadata) across catalogs.

Another object of the invention is to combine the recommendations of the system with explicit human merchandising objectives either through "hard" rules that filter results by specified criteria or "soft" rules that bias the results towards a defined business goal.

Another object of the invention is to provide recommendations to groups of subjects based on the best match to their collective profiles.

Another object of the invention is to enhance product and content marketing by characterizing the attributes of object profiles.

Another object of the invention is to identify appropriate subjects for the marketing of a particular object.

The present invention is a system and method for predicting subject responses to objects based on other subjects' responses to that and other objects. The process of matching subject and object profiles produces a predicted response score that can be used to rank recommended content. The scores can be used as is or combined with other business logic to render the final recommendation rank. The invention can be applied to a broad range of applications, including the retailing of single consumption items, such as non-recurring purchases or content views, where the previous purchase or view of an object cannot be used to predict additional purchases or views of the same object. The invention can also be used to predict subject responses to recurring purchases and to recommend new consumables.

The invention considers the interaction of subjects and objects. The subject is an active entity that initiates transactions. The subject consumes or experiences objects and provides feedback on the level of satisfaction with the object. The subject could be a single person or a corporate entity, such as a business. The object is a passive target of interaction by the subject. This could be a physical object, such as a consumer good, for example cars, MP3 player, or ice cream; media, such as music, movies, books, art, or plays; or even a person, as in the case of a job search or a matchmaking service. In the case of active entities, it is possible for the subject and object to reverse roles depending on the situation.

The invention provides a novel solution to the problem of how to identify objects, for example products, that will appeal to a particular subject, for example a person, where the large number of possible objects, including less desirable objects that are descriptively similar but aesthetically different or where some objects may appeal highly to a limited population of subjects while being undesirable to the broader population, makes it difficult for the subject to notice the objects that the subject wants simply by browsing the entire set of objects. This provides a breakthrough for target marketing and retail applications because it allows the consumer, solely by behavior, to "self-market" or "pull" those products which are of interest, rather than requiring that retailers "push" potentially unwanted products through advertising or other inefficient means.

The invention also addresses the issue of consumer privacy because it does not profile the consumer using personal demographics information, which consumers find both invasive and tedious to enter. Thus Resonance improves retailers' ability to target customers, while simultaneously making it easier for consumers to participate.

The invention works by forming profiles of subjects, for example consumers, and objects, such as goods or media, based on aesthetic evaluations of objects by subjects. The invention does not require a priori information about either subjects, such as demographics or psychographics, or objects, such as classifications or genres. Rather, it automatically generates representations of subjects and objects solely from the subjects' interaction with the objects. Because it creates its own abstract representation of subjects, it allows retailers to transparently target the subject without compromising subject privacy through the collection and modeling of sensitive personal information. The profiles can also be extended across catalogs, product or content domains, or across websites or stores.

Note that the identification of subjects and objects is not a physical one and may change depending on the application. For example, in a consumer movie recommendation application, the person requesting recommendations is the subject and the movie is the object. In a dating service application, a person would be considered a subject when searching for matches and an object when being searched by others. Similarly, in the case of employer/employee matching, companies and persons would alternate between the roles of subject and object. Note that in cases where an entity can assume different roles, a different profile would be created for each role.

Because the profiles are symmetric (both subjects and objects are profiled to the same representation), subjects can be matched to other subjects or objects, and objects can be matched to other objects or subjects. For example subject-subject matching could be used on a social networking site to connect people of like interests or on an online store to order product reviews according to the similarity of the reviewer to the reader. Similarly, object-object matching can be used to match keywords to products or content, advertisements to news articles, or promotional banners to referring affiliate sites.

Subjects and objects are represented as a set of derived abstract attributes, or feature vectors. In addition to driving the matching process, the distributions of the dimensions can be used to predict which items will evoke strong reactions (negative and positive) from a typical group of subjects and which items will evoke a more even response across those subjects.

The invention also relates to the field of neural networks and optimization. Generally, neural networks take an input vector through a transfer function to produce an output. Neural network training methods are classified into supervised and unsupervised models. In supervised models the training method adapts the weights of the transfer function to minimize some function of the outputs, such as the mean squared error between the outputs produced by the transformation of the inputs and the expected outputs, which are known for a certain set of inputs commonly known as the training set. Once the weights have been trained, the network can be used to predict outputs for operational inputs. In unsupervised networks the data is clustered in some way that makes it useful for subsequent processing; however, the desired result, namely the closest matching template, is not known during training.

The proposed method is supervised insofar as the desired outputs are known as part of a training set; however, similar to unsupervised methods, the method is also self-organizing insofar as the inputs are not known; i.e., the method derives the input values using a known transfer function and known outputs.

Because of the large number of weights or adapted parameters of the system, which scales as the number of subjects and objects, a key aspect of the method is that the weights for each subject or object are decoupled from other subjects and objects when updated separately. This allows individual subjects and objects to be trained by different processing units, which allows the method to scale up to large numbers of subjects and objects, which may ultimately total millions or tens of millions or more.

A key improvement of the invention over collaborative filters is that it creates not just profiles of the subjects, but profiles of the objects as well. This provides several advantages, including rapid and scalable prediction of subject to object affinities; straightforward cross marketing across product categories; and sorting of objects by aesthetic categories for purposes of browsing and selecting items for consumption or association, such as selecting musical recordings to go with a movie production.

DETAILED DESCRIPTION OF THE DRAWINGS

Figure 1:
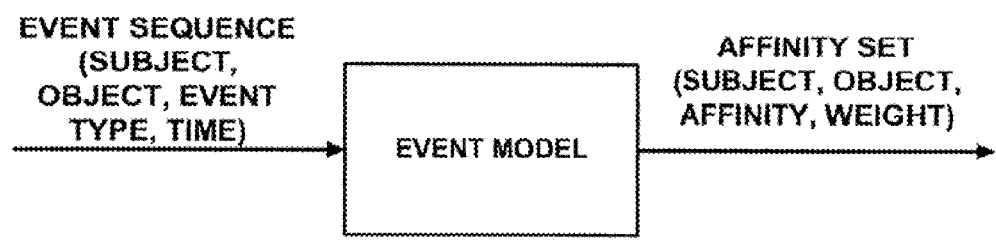
FIG. 1 shows the representation of behavior events as input to the profiling engine.

The following detailed description is related to the technology as described in U.S. patent application Ser. No. 12/415,758 filed on Mar. 31, 2009, and incorporated, in its entirety, by reference herein. FIG. 1 shows the representation of behavior events as input to the profiling engine. The input to the profiling engine is a set of affinities, which describe subjects' interests in the various objects of the domain space. Each affinity instance consists of the subject that generated the affinity, the object of the affinity, the subject's affinity to that object, and the weight of the affinity. The affinity is generally a numeric value or an ordered value that can be expressed numerically. Affinities are generally scaled between some minimum and maximum value, such as 0 to 1, before being put into the profiling engine. The weight of the affinity expresses the certainty of the measurement, such as the probability of reaching the target event given the occurrence of the given event. For example, if the affinity is generated by the subject not interacting with an object presented with other objects on a home page of a website would have a low weight, while the subject's purchase of an item or explicit rating of an item would have a high weight. Weights are numeric and range from 0 (lowest weight) to 1 (highest weight). In some cases the affinities are generated by explicit action of the subject. In other cases, such as in website browsing, the affinities are inferred from the behavior of the subject. In this case the affinities and weights are modeled by the aggregate behavior of the subjects as defined by the target model, which takes a sequence of behavior and converts it into a set of affinities. The behavior sequence consists of a set of events and each event consists of a subject, object, type of event, and timestamp of when the event occurred. The event, or target, model treats the time order of events as important when there are multiple events for a single object, but generally does not consider the time ordering of events across objects; that is, if a subject interacts with object A and then object B, that is considered the same as interacting with object B and then object A.

Figure 2:
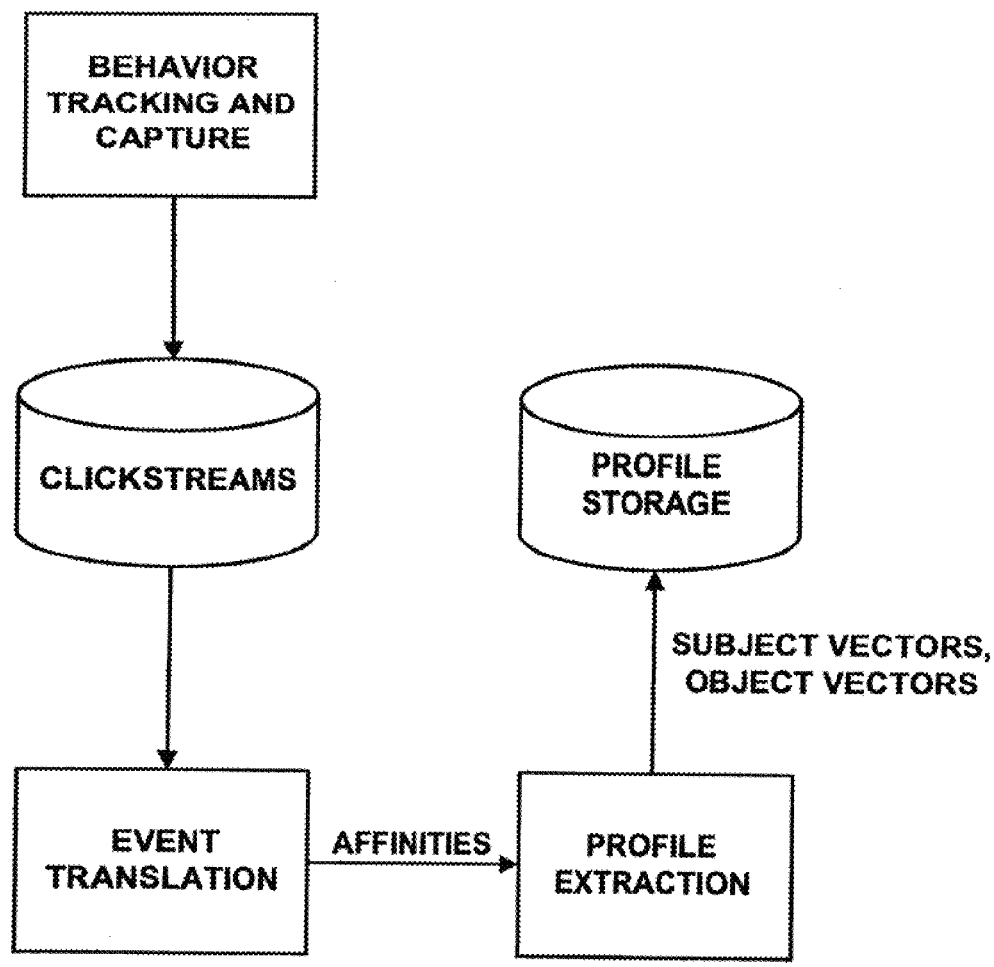
FIG. 2 shows the general conversion of clickstream behavior data into profiled subjects and objects.

FIG. 2 shows the general conversion of clickstream behavior data into profiled subjects and objects. The behavior data consists of a set of actions, or behavior events, as described above, such as browsing a website, using a kiosk, or viewing a media device, whereby the actions are directed towards some outcome, such as purchasing a product, retrieving information, or finding and consuming desirable content. There may be a sequence of interactions with an object to reach the target outcome, with each action leading towards that goal indicating an increased affinity and weight of the subject to the object. A subject's actions are usually contained within limited episodes, or sessions, but the subject's behavior can also be aggregated across all such sessions. The subject and object profiles are extracted from the behavior data using the target model as follows: First, the behavior data is captured by means of a capture device. This can be a web beacon as described below, or any other software embedded into the user interface that can record the subject's interaction with the interface and send it to a centralized computer. When the behavior data is submitted, it may be sent directly to the event translation module (target model), or additionally stored in a centralized data repository for target model development or other later analysis and reporting. The behavior events pass through an event translation module, which converts the clickstream into an affinity and weight for the subject and object. When the subject has a sufficient number of affinities, the subject can be profiled and a subject vector generated. The subject vector is then stored in a database or other data store for purposes of matching against objects for retrieval of best matching content or products for that subject. Similarly, objects are profiled when they have sufficient affinities. Both subject and object profiles are continuously or periodically updated as additional affinities are collected.

Figure 3:
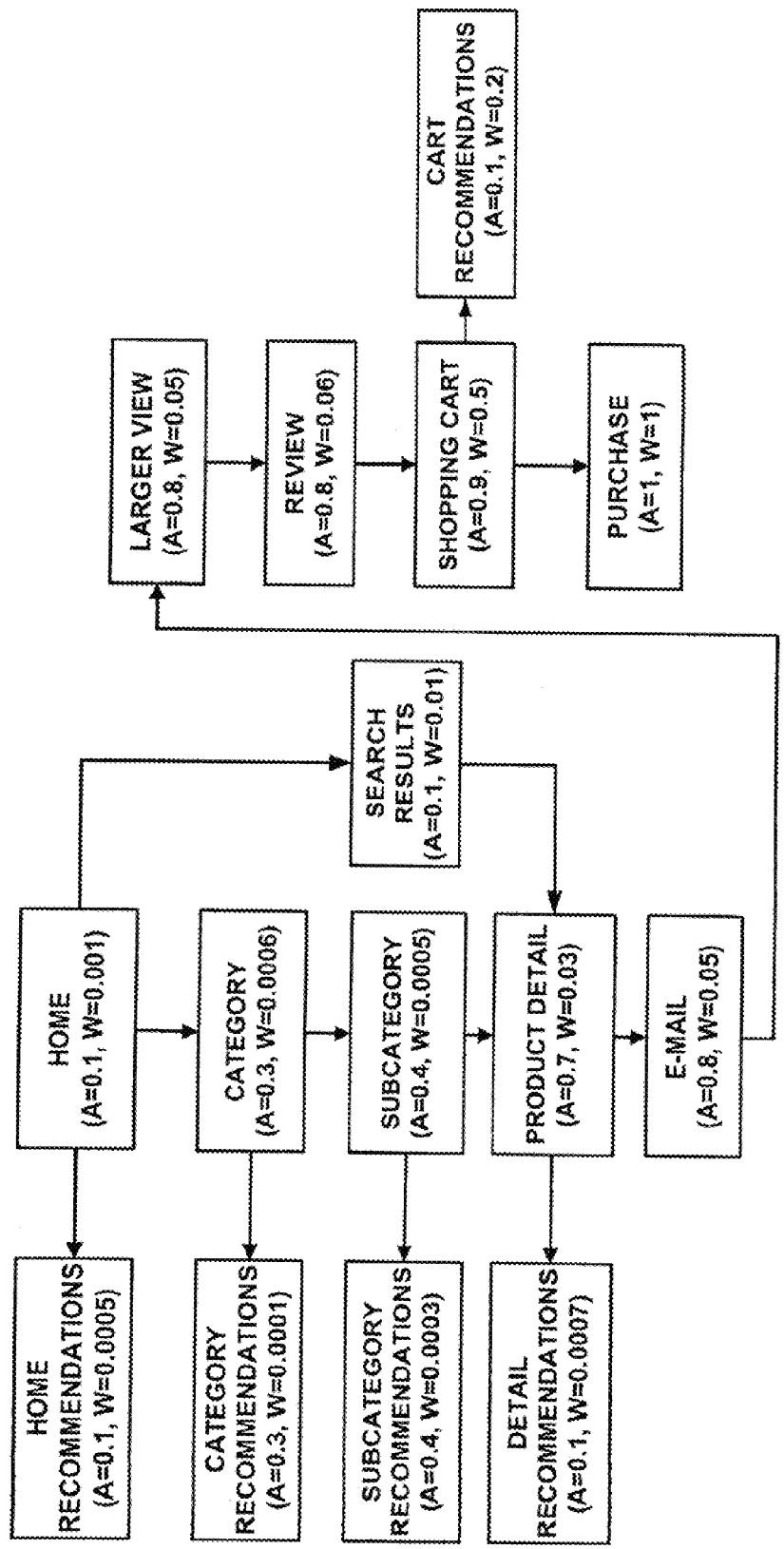
FIG. 3 shows an example of a target model.

FIG. 3 shows an example of a target model. This example shows the events for a typical e-commerce website, or online store. In this case the goal of the website is to get the online shopper to make a purchase. The shopper may not progress through all of the steps shown, but in general will move up and down through this purchase funnel investigating a variety of different products. As the shopper navigates through the site and investigates different products, many different subject-object events may be generated. As described previously, each event is described by a subject, object, affinity, and weight. In terms of profiling, the highest weighted affinity is used. Events may be generated explicitly by the subject selecting a specific object, or implicitly by the subject being presented with an object as a possible option to be selected. As the subject moves closer to the target event, the affinity of the subject to the object generally increases, as does the significance of that affinity measurement. Also, explicit actions tend to be more heavily weighted than implicit actions, because often indirect responses may result from multiple options within the same instance of the user interface, of which it is only possible to select one option. In the case where the subject is presented with an object multiple times, if the subject continues to not select the object for consideration, then the weight of the event may be increased with each rejection of that option. Note that at each level of the website, there may be different indirect events on a given web page, such as a listing of a category's products and recommended products within that category.

Figure 4:
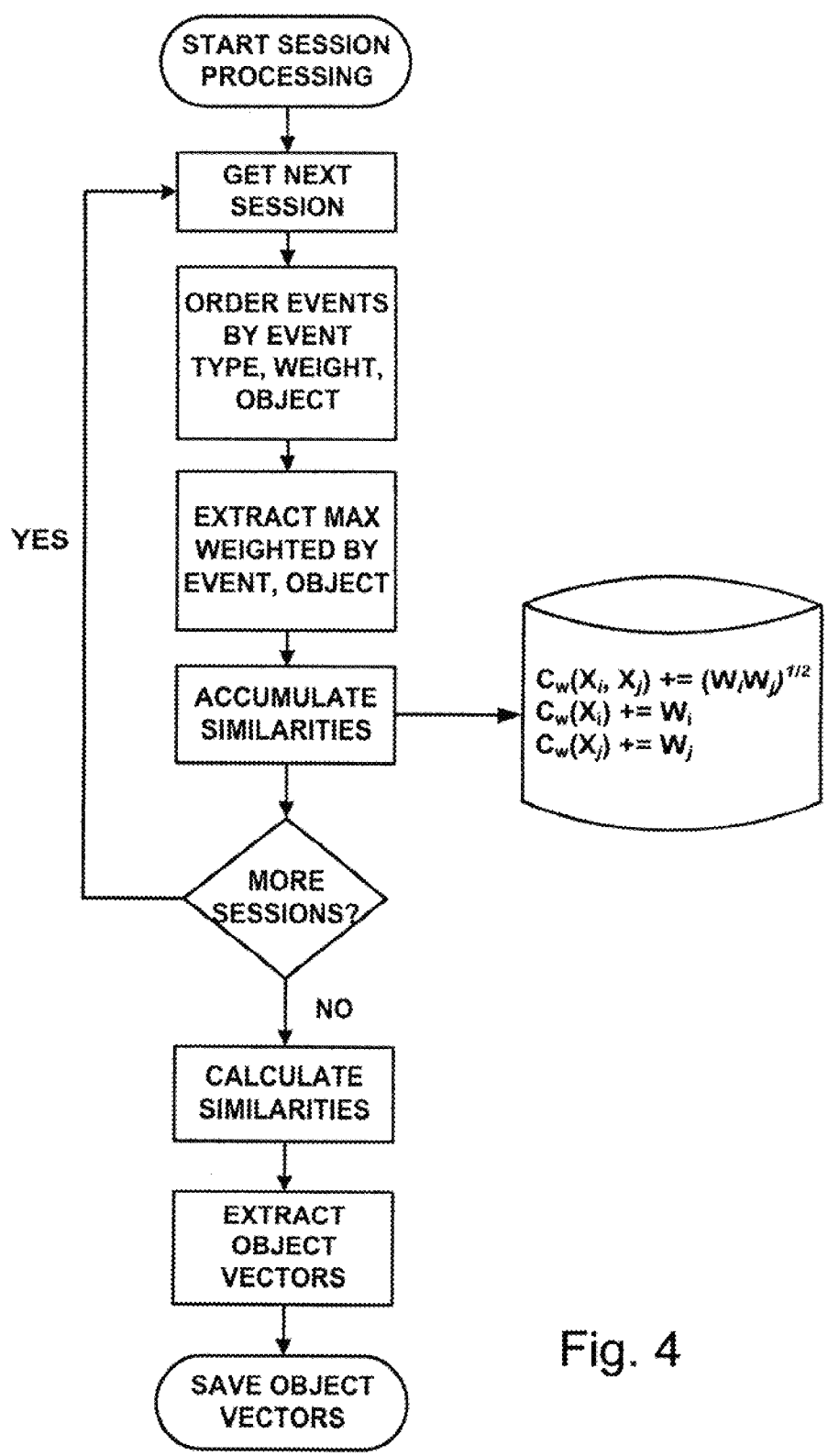
FIG. 4 shows the operation of the system to profile objects based on object-object coincidence, or similarity.
Figure 5:
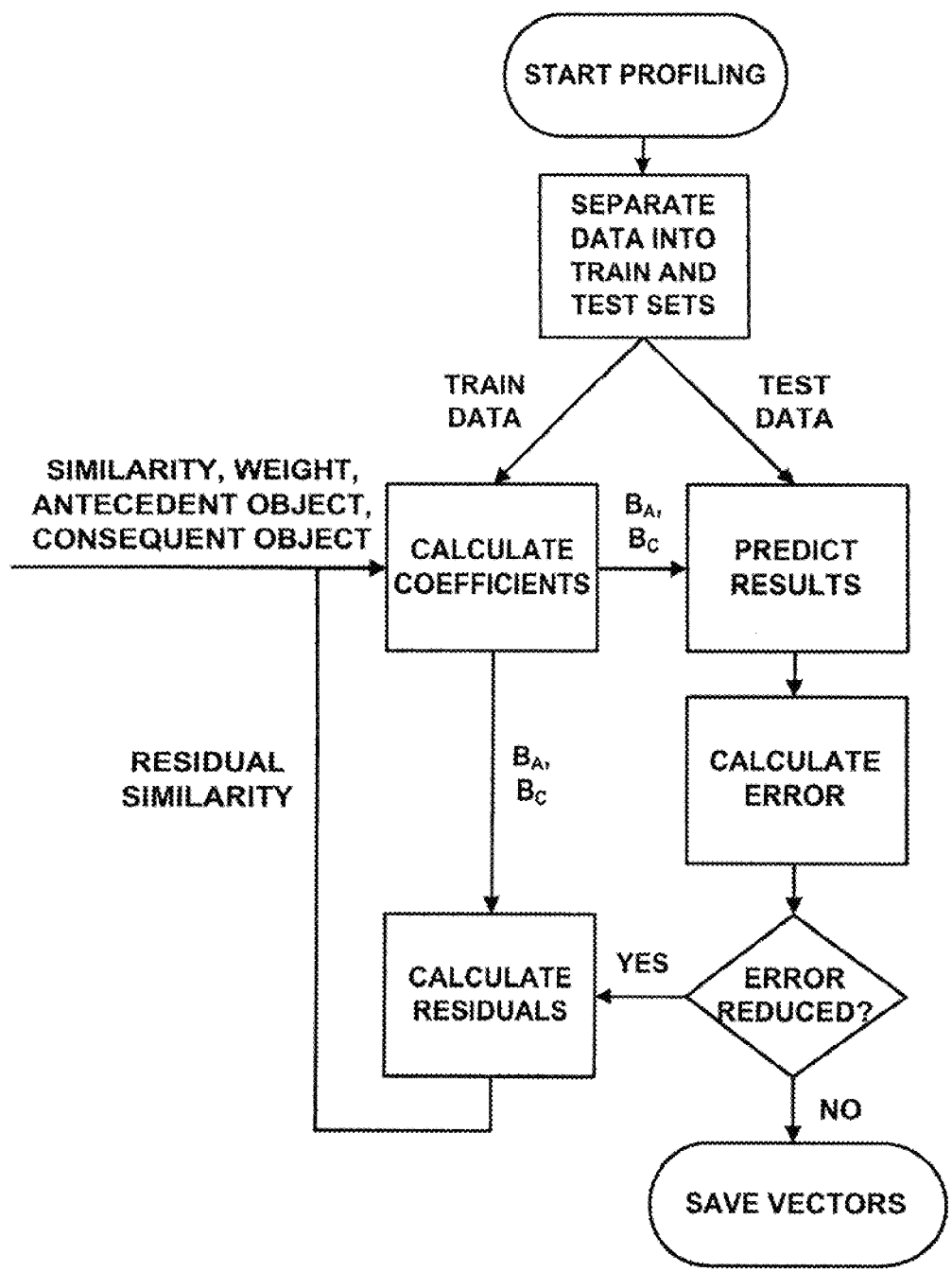
FIG. 5 shows progressive method of deriving object vectors based on similarities.

FIG. 4 shows the operation of the system to profile objects based on object-object coincidence, or similarity. This consists of two processes: First, object similarities are calculated as the weighted correlation between behavior events. Second, the object similarities are factored into object vectors. The similarities are calculated as follows: Behavior events are typically processed on a subject session-by-session basis, but can also be processed across a subject's entire history. For each session, an object is represented by the highest weighted event for that product. After all of the highest weighted events are identified, the weighted co-occurrences are accumulated for each object-object combination. In one embodiment the ordering of the events between objects is not considered, so that the co-occurrences are symmetric; that is, AB=BA. Once the co-occurrences are accumulated over all sessions, the values are normalized to the number of instances and the similarities are produced. The similarities are then used to generate the object vectors as shown in FIG. 5.

We next describe the similarity calculations in more detail. To generate similarities, the behavior histories of the subject population are compared to determine the frequency that one object can be found in the history given the presence of another object (i.e., conditional probability). In the unweighted case, $P(X2|X1)$=conditional probability of $X2$ given $X1$.

Noting that, in general, $P(X1|X2) \neq P(X2|X1)$, we infer that the asymmetry is due to the difference in affinity between X1 and X2. If similarity and affinity range from 0 to 1, then $P(X2|X1)=S(X1,X2)\cdot ave(A(X2))$, where $S(X1, X2)=S(X2, X1)$ is the similarity between X1 and X2 and ave(A(X2)) is the average affinity of X2 across all of its subject ratings, or affinities. The decomposition of the conditional probability into a similarity factor and an affinity factor captures the heuristic that X1 and X2 are unlikely to be found together if they are highly dissimilar or one or the other is not very popular. This decomposition introduces two unknowns, the similarity and average affinity. To reduce this to just the similarity, we can estimate the average affinity by the occurrence of the object, so that ave(A(X1))=P(X1). Thus, the similarity can be calculated as $S(X1,X2)=P(X1|X2)/ave(A(X1))=P(X1|X2)/P(X1)=P(X2|X1)/P(X2)=S(X2,X1)$.

Note that we have applied Bayes Theorem, $P(X1|X2)/P(X1)=P(X2|X1)/P(X2)$; hence, S is symmetric; that is, $S(X1, X2)=S(X2, X1)$. Substituting $P(X1|X2)=P(X1 \cap X2)/P(X2)=C(X1 \cap X2)/C(X2)$ and $P(X1)=C(X1)/C_{total}$, this can also be expressed as $S(X1,X2)=C_{total}*C(X1 \cap X2)/[C(X1)*C(X2)]$, where $P(X1 \cap X2)$ is the joint probability of X1 and X2 occurring in the same instance, $C(X1 \cap X2)$ is the count of instances in which both X1 and X2 occur, $C(X1)$ is the count of instances with X1, either with or without X2, and $C(X2)$ is the count of instances with X2, either with or without X1. Note that $C_{total}=[C(X1)+C(X2)-C(X1 \cap X2)]$ is the number of instances that include X1, X2 or both. For example, if the source of the data is past purchase data, then Ctotal would be the number of transactions containing X1, X2, or both. If the source of the data is browsing history, then Ctotal would be the number of sessions containing X1, X2, or both. Also note that the symmetry of S assumes that there is no ordering of the data. For example, if the similarity data comes from past purchase data, it is generally not known whether one item was purchased after another item; it is only known that they were purchased together. In this case there is less of an issue because past history data by definition restricts associations to cross-sells (e.g., accessories), but in more general browsing scenarios, this can confuse cross-sells and upsells. This issue is addressed by introducing time-ordering and making S asymmetric, as described further below.

The above method applies when all of the events are equally weighted, such as when the data comes from past purchase data. In the case where subjects interact with objects at differing levels of the target model, each type of event is weighted differently. The above approach is generalized to this case by adding event weights, w, as follows:

$$S(X1,X2)=Ctotal\cdot C(X1\cap X2)/[C(X1)\cdot C(X2)] \rightarrow$$
$$S(X1,X2)=[sum(w(X1))+sum(w(X2))-sum(sqrt(w(X1)\cdot w(X2)))]\cdot sum(sqrt(w(X1)\cdot w(X2)))/[sum(w(X1)\cdot sum(w(X2))],$$

or $$S(X1,X2)=[Cw(X1)+Cw(X2)-Cw(X1\cap X2)]\cdot Cw(X1\cap X2)/[Cw(X1)\cdot Cw(X2)],$$

where $$C_w(X_i) = \sum_{k=1}^{N_{sessions}} w_k(X_i)$$

$$C_w(X_1, X_2) = \sum_{k=1}^{N_{sessions}} [w_k(X_1)\cdot w_k(X_2)\cdot r_k(X_1, X_2)]^{1/2}$$

$$r_k(X_1, X_2) = 1, \text{ if objects 1 and 2 are both in session } k$$
$$= 0, \text{ otherwise}$$

Note that the r function can be omitted if it is assumed that $w_k(X_i)=0$ when $X_i$ is not in session k. The weight used for $X_i$ is the maximum for all direct events of $X_i$ in the given session.

The above methods of similarity calculation do not include time ordering or implied causality. In cases where time-ordering may be important, such as to distinguish cross-sells from upsells on an e-commerce website, it is useful to only count instances where the conditional item, or consequent, is observed after the source item, or antecedent. This modifies the above approaches by adding time order. Explicitly, the calculations are the same except that C(X1, X2) only considers sessions where $t(X1) \geq t(X2)$. Note that the sequencing criterion is applied to the first direct events of X1 and X2, but the weights that are used in the calculations are still the maximum weights for each, even if the weight is not associated with the event used to pass the sequencing criterion.

For the above methods, there are two methods of updating similarities. In the first approach, called windowing, the similarities are calculated over a sliding time window. The data can be summarized in periodic slices, such as a day or week. Although shorter periods will more closely track changes in the behavior of the environment, longer periods will have greater statistical confidence and will be more computationally efficient to maintain (less storage and fewer calculations for a given time window). In the second method, called the flywheel method, a similarity is updated as a convex combination of the previous similarity and the partial similarity calculated over the update period:

$$S(t+1)=f\cdot Sp(t+1)+(1-f)\cdot S(t),$$

where S is the similarity, Sp is the partial similarity calculated over the update period, and f is a number between 0 and 1 that weights new information against the previous calculation. In effect f controls the rate at which old information is "forgotten". If f is large, then new information is emphasized and old information is forgotten more quickly, and vice versa. A variant of this approach is to only update S(Xi, Xj) for a given Xj when there is new information available, that is when Sp(Xi, Xj)>0 for some Xi. This allows the system to track the behavior for active objects, while retaining knowledge of dormant objects until they become active again. For example, this could be used to maintain targeting information for seasonal or holiday products until the season or holiday recurs.

FIG. 5 shows a progressive method of deriving object vectors based on similarities. This figure shows the most general case where the similarities are not symmetric; that is, $S(X1,X2) \neq S(X2,X1)$. In this case there is an antecedent object, and associated object vector $B_A$, that occurs first, and then a consequent object, and associated object vector $B_C$, that occurs second. In the symmetric case this reduces to a single set of vectors $\{B_A\}=\{B_C\}$. Training the object vectors follows the method of the following steps: first, the similarity data is split randomly into training data and testing data, whereby the training data is used to calculate the next set of coefficients, and the testing set is used to assess whether the incremental dimension is effective in predicting similarities. Both the training data and the testing data consist of entries of the form {antecedent object i, consequent object j, similarity S, weight w}. The object vectors are calculated dimension by dimension as follows: For the first dimension the training data are used to generate single-dimension object coefficients according to the bootstrap training method described previously. The resulting 1-D vectors are then used to generate predicted similarity values for the antecedent-object/consequent-object combinations in the test set. The predicted similarities are compared to the actual (known) similarities and the mean-squared error $f_{SE}$ is calculated across all similarities in the set as $$f_{SE} \equiv \left[\frac{1}{G}\sum_{i=1}^{N_{antecedent}}\sum_{j=1}^{N_{consequent}}(S_{ij} - w_{ij}B_i\cdot B_j)^2\right]^{1/2},$$

where $S_{ij}$ is the similarity of the object i to object j, $w_{ij}$ is the weight of the measurement, and $$G=N_{antecedent} \times N_{consequent} \times N.$$

Next, the residual similarities [actual−predicted] are calculated. On the second and subsequent passes, the residual similarities are substituted for the similarity values used in the previous iteration. The next set of coefficients are calculated and appended to the previous object vectors. The predicted similarities are re-calculated for the test set and compared to the residual similarities. The resulting error function is compared to the previous iteration. If the error is reduced, then the residuals are fed to the next iteration and the next dimension of coefficients is generated. If the error function is not reduced, the vectors are truncated and saved for live deployment. Note that at each iteration, the vector values need to be initialized with non-zero values. This can be done by setting the values randomly from −1 to +1 or by setting the values to what would reproduce the average similarity across all of the samples for that object.

Unlike other modeling approaches, which determine the model parameters from a set of known input/output relationships, the present invention derives both the inputs and the model parameters from a set of known outputs and a specified transfer function (e.g., dot product between antecedent vector and consequent vector). In this sense the object vectors have roles both as input vectors and as model parameters. More specifically, when the antecedent object vector is calculated, the consequent object vectors are treated as inputs to a linear regression model and the antecedent object vector is the set of linear coefficients. However, when the consequent object vector is calculated, the roles are reversed, and the antecedent object vectors are the inputs and the consequent object vector is the set of model coefficients. Although each individual fit can be seen as a linear model involving a small number of parameters, the aggregate process of simultaneously building both sets of object vectors is a nonlinear model with a very large number of parameters.

A key advantage of this approach is that it automatically derives the attributes that describe the objects, as opposed to requiring a detailed analysis of the domain of the application and expert definition of a set of attributes that may only apply to that domain. For this reason the invention is self-adaptive and self-optimizing to any application, without regard to types of objects, behavior of subjects, language, or culture. A second advantage is that this method automatically determines the optimal number of dimensions to describe the objects, resulting in maximum predictive effectiveness with the most compact and computationally efficient form. A third advantage is that, unlike models where the inputs are fixed, because the model inputs in this method are self-derived, it is possible to calculate the dimensions sequentially instead of simultaneously. Not only is this more computationally efficient, but because each successive dimension is trained against the residuals of the similarities, the dimensions are naturally ranked and orthogonal, effectively reproducing a principal components factorization of the similarity data. This makes it possible to initiate a profile of an object prior to obtaining a number of samples equal to or more than the number of dimensions in the model. Instead, the underdetermined object vector can be calculated up to the dimension equal to the number of samples and the subsequent dimensions can be set to zero.

Figure 6:
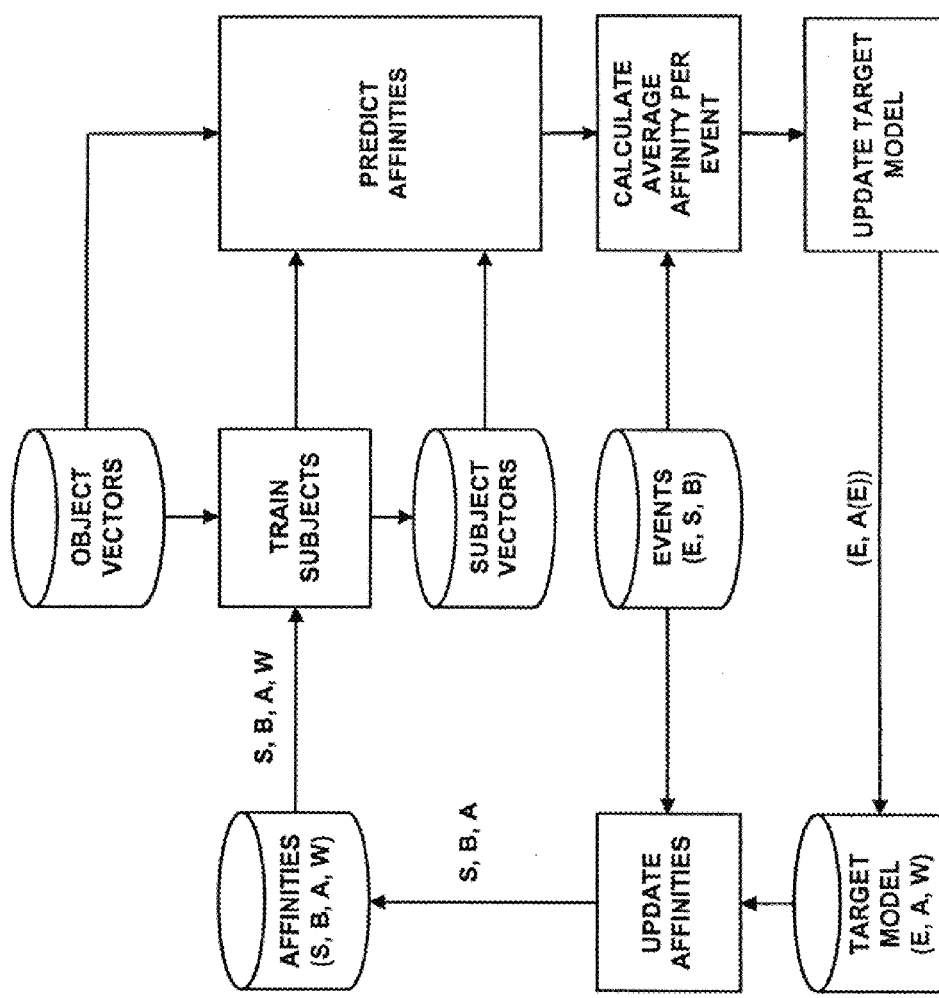
FIG. 6 shows the workflow to determine the affinity levels for behavior events based on object vectors derived from similarity measures.

FIG. 6 shows the workflow to determine the affinity levels for behavior events based on object vectors derived from similarity measures. In this case the object vectors are fixed because they have been calculated from the similarities. Thus, given a set of affinities based on the target model, the corresponding subject vectors can be derived using the single subject update method according to the following steps: once the subjects have been trained, then the subject and object vectors are used to calculate the predicted affinities for all of the affinities used in the subject training. The average affinity is calculated for each type of event and the target model is updated with the new average affinities. The updated target model is then used to update the affinity values. Finally, the updated affinities are used to calculate new subject vectors and the target model update process is repeated. The training cycle is repeated until the target model affinities converge to a set of stable values, that is, when the difference between successive values falls below some minimum value, such as 10 to the power of −6. Note that the weights remain fixed throughout this process because they have already been determined by the average event conversion probabilities as described in FIG. 4.

Figure 7:
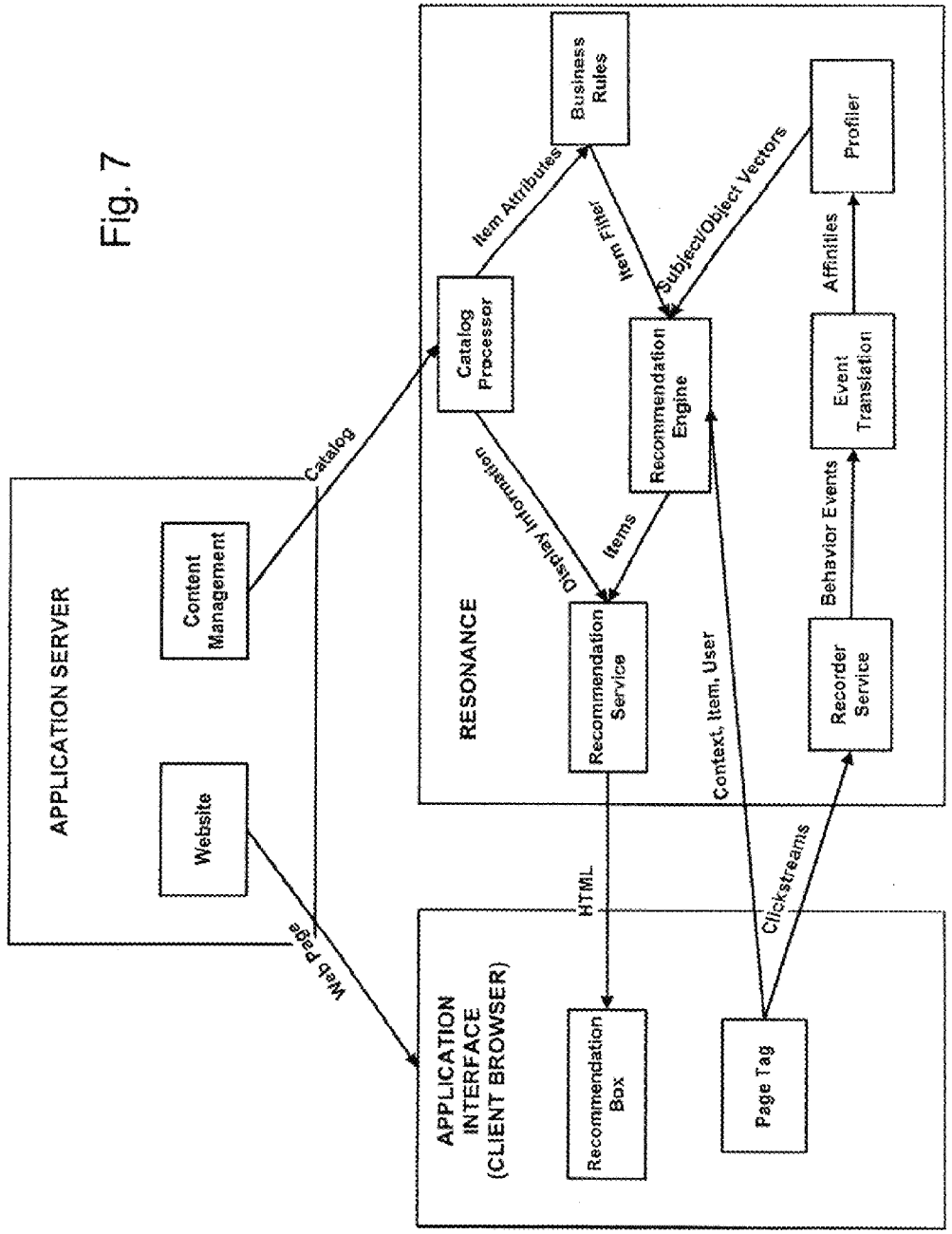
FIG. 7 shows the system components and workflow for an integrated web-driven profiling, targeting, and merchandizing system.

FIG. 7 shows the system components and workflow for an integrated web-driven profiling, targeting, and merchandizing system. The application interface allows the subject to identify itself to the system (implicitly through a browser cookie or explicitly through a user login), record responses to objects (either by explicit rating or implicit behavior), and get recommendations for other objects. Responses are recorded in the Resonance database along with the responses of other subjects. The system indexes ratings in the database by subject and object. In the case of implicit ratings these are inferred by recording the user's behavior, as extracted from clickstreams, and then translating the various types of interactions into affinity values that can be used by the profiler. The profiler creates the representations of the subjects and objects from the recorded ratings data and saves the profiles in a profile database.

An application interface, such as a client web browser, generates a recommendation request for items within a specific set of objects (catalog) relative to the application. The recommendation request identifies the application, the application user, or subject, the number of records to return, and the request type. The request context may include a currently viewed item, which is cross-linked through an object lookup to an internal reference catalog. Similarly, the subject is cross-linked through a subject lookup to an internal subject list. Given the context and subject, the recommendation engine generates a rank-ordered list of recommendations, identified by their internal object IDs. These object IDs are cross-linked back to application catalog items and returned to the application, which then displays the results.

The recommendation engine generates recommendations by matching the subject and object profiles. The application server and associated processes generate the web pages that are rendered by the application interface, as well as generate a description of the catalog from which the recommended content will come. The catalog includes classification information and display information. The classification information can be used to construct business rules that filter the profiled recommendations according to known business knowledge. The resultant recommended items are combined with the display information from the catalog and returned to the application interface for display.

Figure 8:
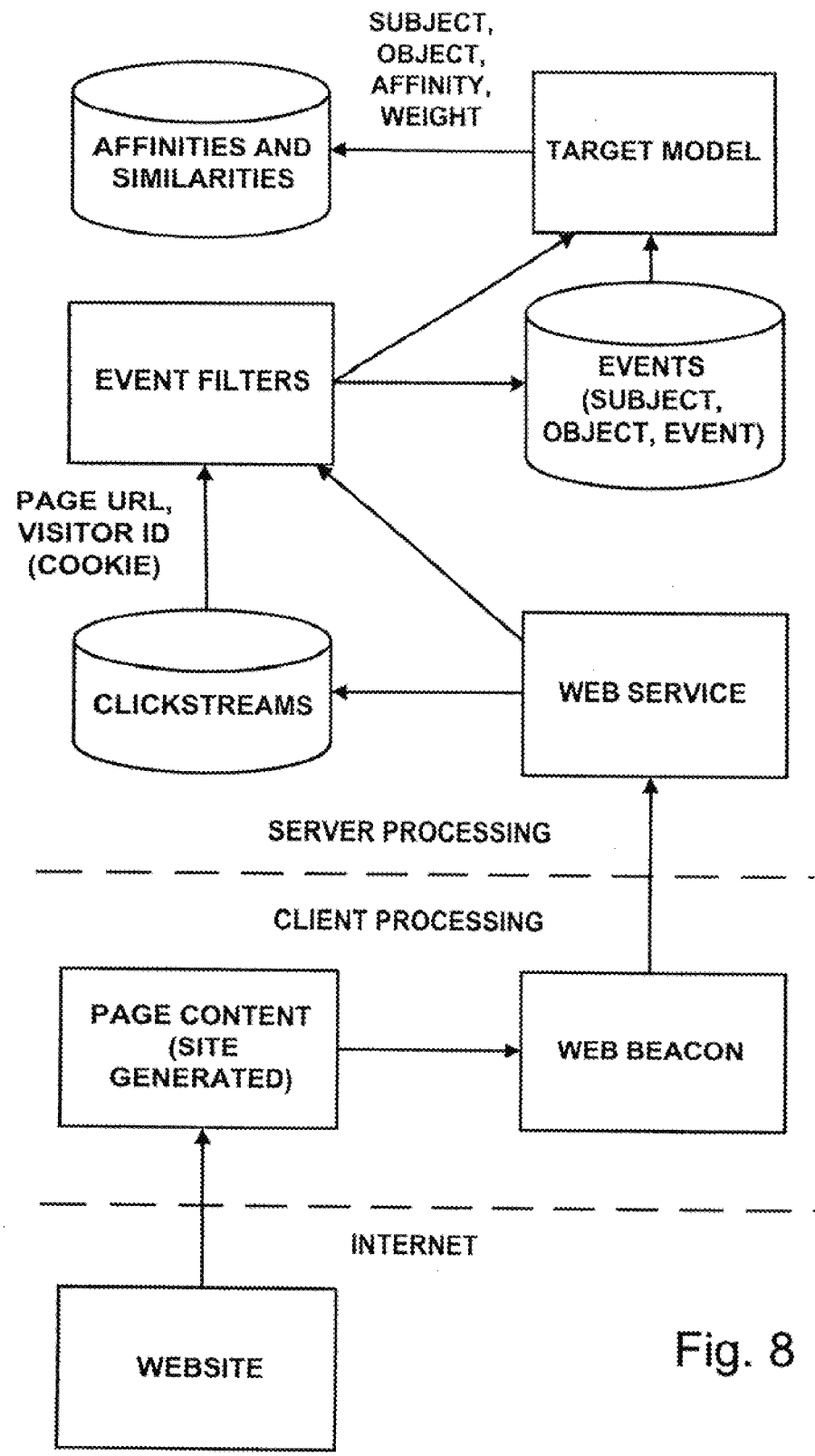
FIG. 8 shows the embodiment of the system to collect behavior data from a website and the translation of behavior events into subject-object affinities.

FIG. 8 shows the embodiment of the system to collect behavior data from a website and the translation of behavior events into subject-object affinities. As the website visitor browses the website, using a web, or client, browser, the web server generates the page to be displayed as HTML, and then sends the HTML to the client browser, which then displays the page to the visitor. In addition the website includes hidden code, called a web beacon that collects information about the page and sends it to the tracking and profiling server, which is generally independent of the website server. The profiling server accepts the browser information via a web service and then saves it into a clickstream database. The clickstreams are then passed through an event filter that converts the clickstream data, for example a URL, into a subject-object event. Finally, the resulting events are converted to affinities using the target model. The embodiment in FIG. 8 shows that the clickstreams, events, and affinities are stored in their respective databases for later processing and target model development; however, in an operational system the data can be immediately processed in each of these steps without going through intermediate storage.

Figure 9:
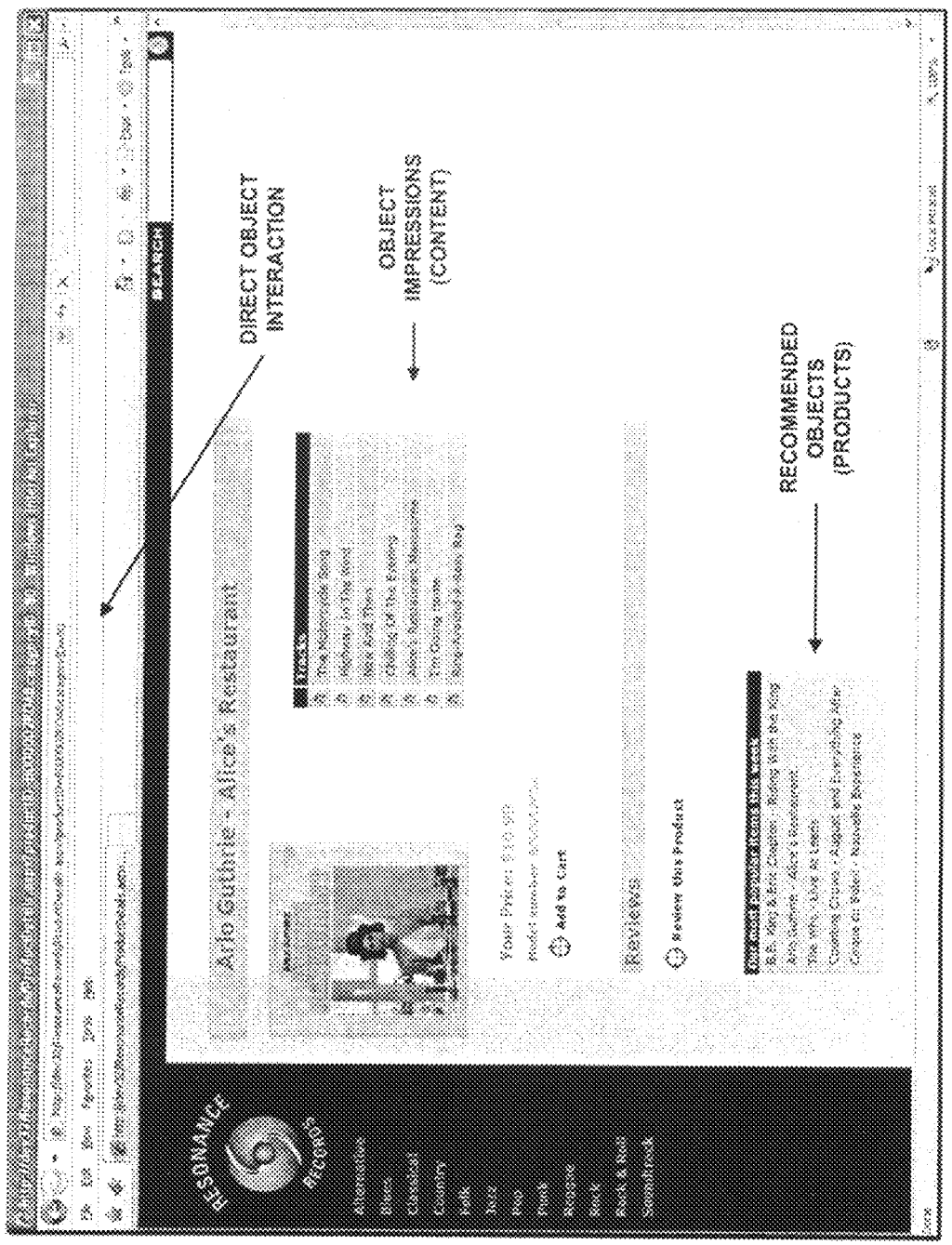
FIG. 9 shows an example of the collection of object interactions and option links from a web page.

FIG. 9 shows an example of the collection of object interactions and option links from a web page. The universal resource locator (URL) identifies how to retrieve a particular web page from the web server. The URL of the web page represents the direct action of the subject, while other URLs on the page, or page links, represent subsequent actions that the subject might take. The page links are therefore indirect actions or events. A page may have multiple direct events, for example the list of items purchased on the purchase confirmation page, but generally these events will all be of the same event type. Similarly, a page may have multiple page links, but these will often be of different event types. For example, FIG. 9 shows some links to content associated with the selected item of interest, as well as other "recommendation" links to other items that the system has determined to be of potential interest to the subject. Data is collected by adding a web beacon or JavaScript to the page code, which executes when the page is loaded by the browser. An example of the code that is added, which is usually inserted before the closing </body> tag of the HTML, is shown below:

```
<!-- Resonance code resxclsa.js v2.x Copyright 2004-2008 Certona
Corporation www.certona.com -->
    <script type="text/javascript">
    var resx = new Object( );
    resx.appid="monitor01";
    resx.top1=50000;
    resx.top2=80000;
    resx.lkmatch=/productId%3D\w+/i;
    resx.rrec=true;
    resx.rrelem="home_rr";
    resx.rrcat="nspaceC01";
    resx.rrnum=5;
    resx.rrcall="go";
    </script>
    <script type="text/javascript" src="scripts/resxclsa.js"></script>
<!-- Resonance end -->
```

The JavaScript code is not specific to any particular website, but rather is applied to a specific website by setting variables that are used by the JavaScript. The variables include:

appid=identifies which website/application is being tracked.

top1=determines percentage of traffic assigned to first recommendation segment, according to top1/100000. Thus, 100000=100%. The first recommendation segment is usually the Resonance segment. In the above example, resx.top1=50000 assigns 50% of the traffic to segment 1.

top2=determines percentage of traffic assigned to second recommendation segment, according to (top2−top1)/100,000. The second recommendation segment is usually shown the pre-existing site content and is treated as a control for the Resonance recommendations. If top2<100000, then a percentage of traffic (100000−top2)/100,000 will be assigned to a second control segment. In the above example, resx.top1=50000 and resx.top2=80000 assigns 30% of the traffic to segment 2 and 20% of the traffic to segment 3.

lkmatch=regular expression, or pattern match, to identify content links that correspond to application objects. The objects of both the direct and indirect events can be inferred from the URLs of their links or by setting variables. The URLs contain information about the website, as well as information about the specific object. The actual identity of the object is determined by applying a pattern match to the URL. This pattern matching uses regular expressions.

ltmatch=regular expression, or pattern match, to identify specific types of links of interest. For example this can be used to generate specific events for a subset of the links on the page, such as a pre-existing recommendation box.

rrec=flag to determine whether to display recommendations. If rrec=true, then recommendation with be inserted inside the HTML <div> tag identified by rrelem.

Otherwise, the site content will not be changed and the original site content will be displayed.

rrelem=indicates the location (<div> tag) to overwrite the page with the dynamic content generated by the system.

rrcat=indicates the application catalog from which to retrieve content.

rrnum=number of recommendations to return.

rrcall=callback function for JSON or Iframe rendering of recommendation box.

Rather than rely on the pattern matching of the URL, the website code can also identify the objects of interest by setting variables, as shown below. This method is particularly useful where the information cannot be readily coded in a URL, such as when multiple objects are the target of the action.

```
<html>
<head>
    <title>Web Site</title>
</head>
<body>
    <!-- page content here -->
    <!-- Resonance start -->
<script language="JavaScript1.3">
<!--
var resx=new Object( );
resx.appid="app01";
resx.top1=33333;
resx.top2=66667;
resx.lkmatch=/[regular expression to match links]/;
resx.rrec=false;
resx.event = "purchase+confirmation"
resx.itemid = "13224;44121;54124"
resx.qty = "2;1;4"
resx.price = "25.99;300.45;101.29"
resx.shipping = "13.00"
resx.total = "770.59"
resx.transactionid = "TR49893"
resx.customerid = "C4893893"
//-->
</script>
<script type="text/javascript" src="/YOURFOLDER/
resxclsa.js"></script>
<!-- Resonance end -->
</body>
</html>
```

The additional variables not defined in the previous example are:

event=name of the event.
itemid=catalog items.
qty=number of catalog items (e.g., number purchased).
price=price of each item.
shipping=shipping costs for the transaction.
total=total cost of the transaction.
transactionid=internal ID by which the application identifies the transaction.
customerid=internal ID by which the application identifies the customer.

In another embodiment the data is collected using web services rather than the web beacon. In this case the information is passed directly from the web server rather than from the client browser. The above variables can be set as parameters of the web service call.

Figure 10:
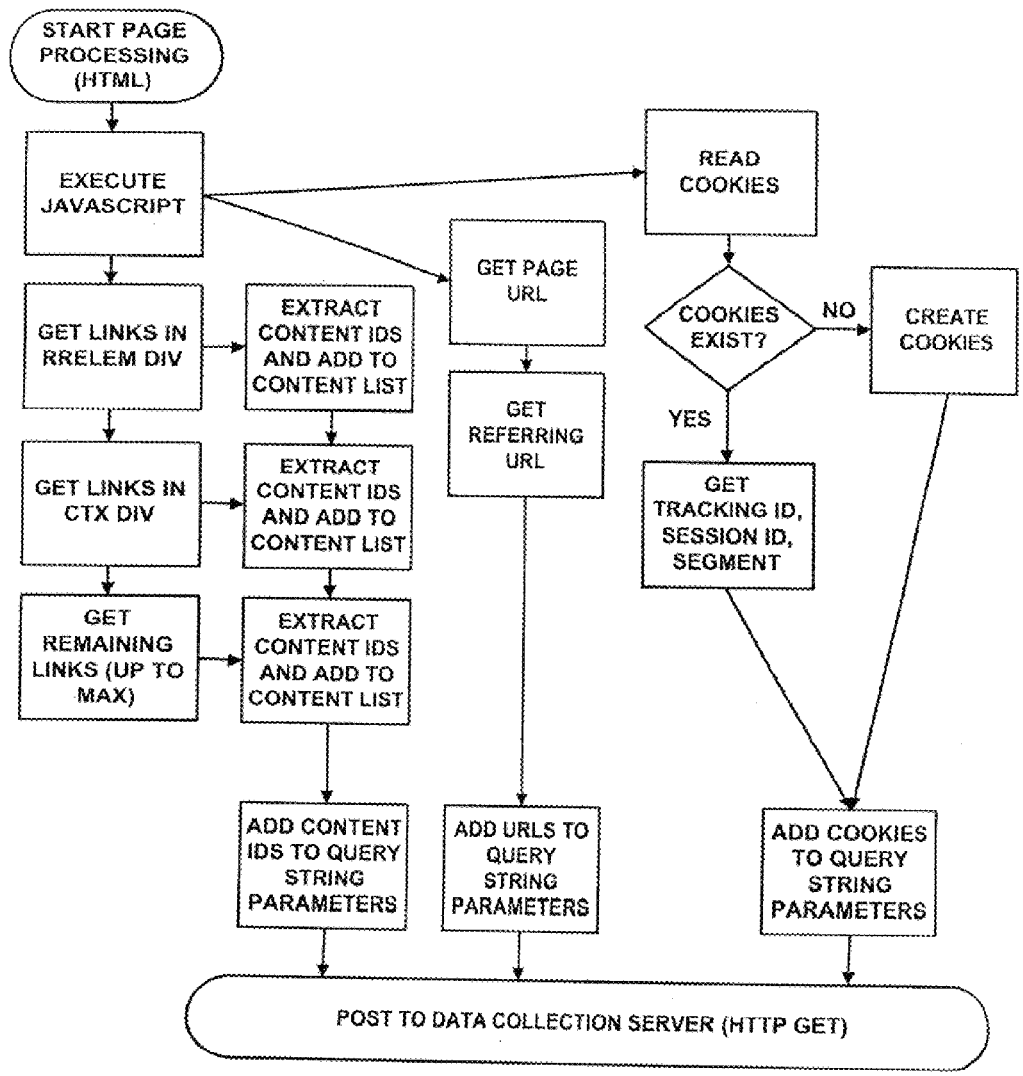
FIG. 10 shows the processing of the web page with a web beacon.

FIG. 10 shows the processing of the web page with a web beacon. The web server generates the web page in HTML format that can be interpreted by the client web browser to render the page visually. The displayed page also contains hyperlinks that allow the user to go from the current page to a related page. There is also non-visual code, or scripts, that execute other actions. The Resonance web beacon is a script that scans the page HTML and extracts object information; parses the page URL and referring URL for context information; creates and reads cookie information; assigns website visitors into different test segments; submits collected data for profiling the visitor; and requests and displays recommendations based on visitor profile and web page context. This is done as follows: Using the document object model (DOM), the Resonance script scans through the HTML source to find all of the links that match a pre-defined content pattern, or regular expression. The script variables may define different areas of the page to search for links. This is done using HTML <div> elements. These <div> elements may demarcate where to find links to define objects for contextual reference in making recommendations; links that are to be overwritten by the recommendations; and links that are to be included or excluded in the profiling. As each item is extracted from its link, the item ID and reference <div> are added to the content list that will be submitted to the web service at the end of the page processing. Note that since the script will start executing as soon as the web browser encounters it in the HTML code, the script needs to be placed after all of the links that are to be processed. Next, the Resonance script retrieves the page URL and referring URL from the DOM. According to a regular expression defined by a script variable, the URLs are pattern matched and the item IDs, keywords, or other context or content identifiers are extracted. These are used both for generating affinity events for the visitor/subject and item/object combination and for defining the context for recommendations as will be described in FIG. 12. Next, the script attempts to read the visitor's cookie information. The cookie information includes a visitor tracking identifier that is unique to that user on that computer or browser; a session identifier that links the current sequence of actions together; and a segment assignment that determines whether the visitor is to be presented with dynamic content from the Resonance system or the pre-existing site content. If the cookies do not exist, then the script creates the visitor tracking ID and session ID cookies, as 15-digit random numbers, and assigns the visitor to a test segment as described further in FIG. 11. While the cookies can either be first party, that is within the domain of the website, or third party, that is outside the domain of the website, for protection of visitor privacy the preferred embodiment is to use first party cookies. The various types of cookies do not persist for the same duration. In order to recognize the visitor upon a later return, the tracking ID cookie is set to last indefinitely, for example 10 yrs, while the session ID cookie only persists for sufficient time to connect different episodes of a single transactional activity, typically 30 minutes. After all three types of information (links, URLs, and cookies) have been extracted, the script combines the information and submits it to the data collection web service, using a HTTP GET command. Note that because the pattern matching extracts just the content, or item, identifiers from their hyperlinks, this significantly reduces the size of the data packet submitted to the data collection web service. Besides reducing transfer bandwidth requirements and response times, this keeps the packet size below the maximum packet size limits on the GET command that occur on some web browsers.

Figure 11:
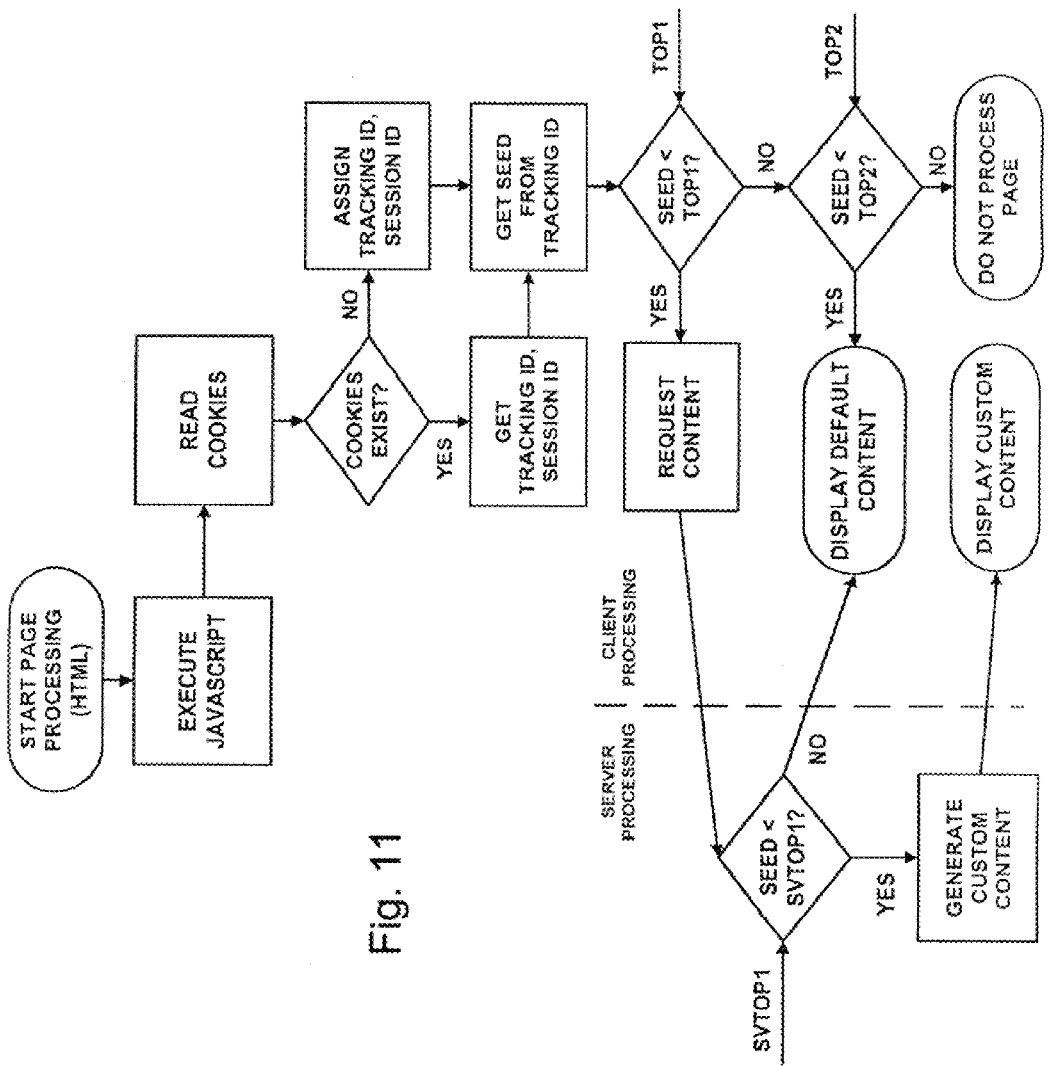
FIG. 11 shows the operation of the system to generate and measure multiple test groups.

FIG. 11 shows the operation of the system to generate and measure multiple test groups. As described in FIG. 10, when the Resonance web beacon executes, it looks for the tracking ID and session ID cookies, and, if these do not exist, then it creates them as 15-digit random numbers. Next, the script extracts digits 2 through 6, which are called the seed, from the tracking ID, which gives a number between 0 and 99999. The seed is compared to the top1 variable that has been set for the page. If the seed is less than top1, then the visitor is assigned to segment 1, which is the segment that is shown targeted recommendations as generated using the methods in this invention. If the seed is greater than or equal to top1 but is less than the top2 script variable, then the visitor is assigned to segment 2, which is shown the pre-existing site content and is tracked by the system as a reference, or control, for segment 1. If the seed is greater than or equal to top2, then the visitor is assigned to segment 3, in which case the visitor is shown the pre-existing site content, but is not tracked as a reference within the system reporting. Instead, this might be tracked by third party web analytics. This allows the creation of multiple controls and also can be used to regulate the amount of traffic that must be handled by the data collection service in the case where the system is being used to test recommendations on a small subset of the website's visitors; that is, where it is not desirable or necessary to allocate the system hardware computing resources to collect and process all of the data. When the visitor is in segment 1, then dynamic recommendations are generated by the script sending a request to the recommendation service. The recommendation service performs a check of the seed against a second, server-side, split variable (svtop1). If the seed value is less than svtop1, then the recommendation service returns the recommendation display HTML, which is inserted into the HTML at the location marked by the <div> tag specified by the rrelem script variable. If there is existing content within this <div>, then that content is replaced by the dynamic content returned by the recommendation service. Otherwise, if the seed value is greater than or equal to svtop1, then the recommendation service returns a flag to the web beacon that tells the web beacon to leave the existing content as is. In order to prevent the visitor from seeing the pre-existing content intermittently, additional code is inserted into the page to hide the content inside the rrelem <div> tag until it is determined that the visitor is in segment 2 and should be shown the pre-existing content. This prevents the visitor from seeing a "flicker" where the pre-existing content is located.

Figure 12:
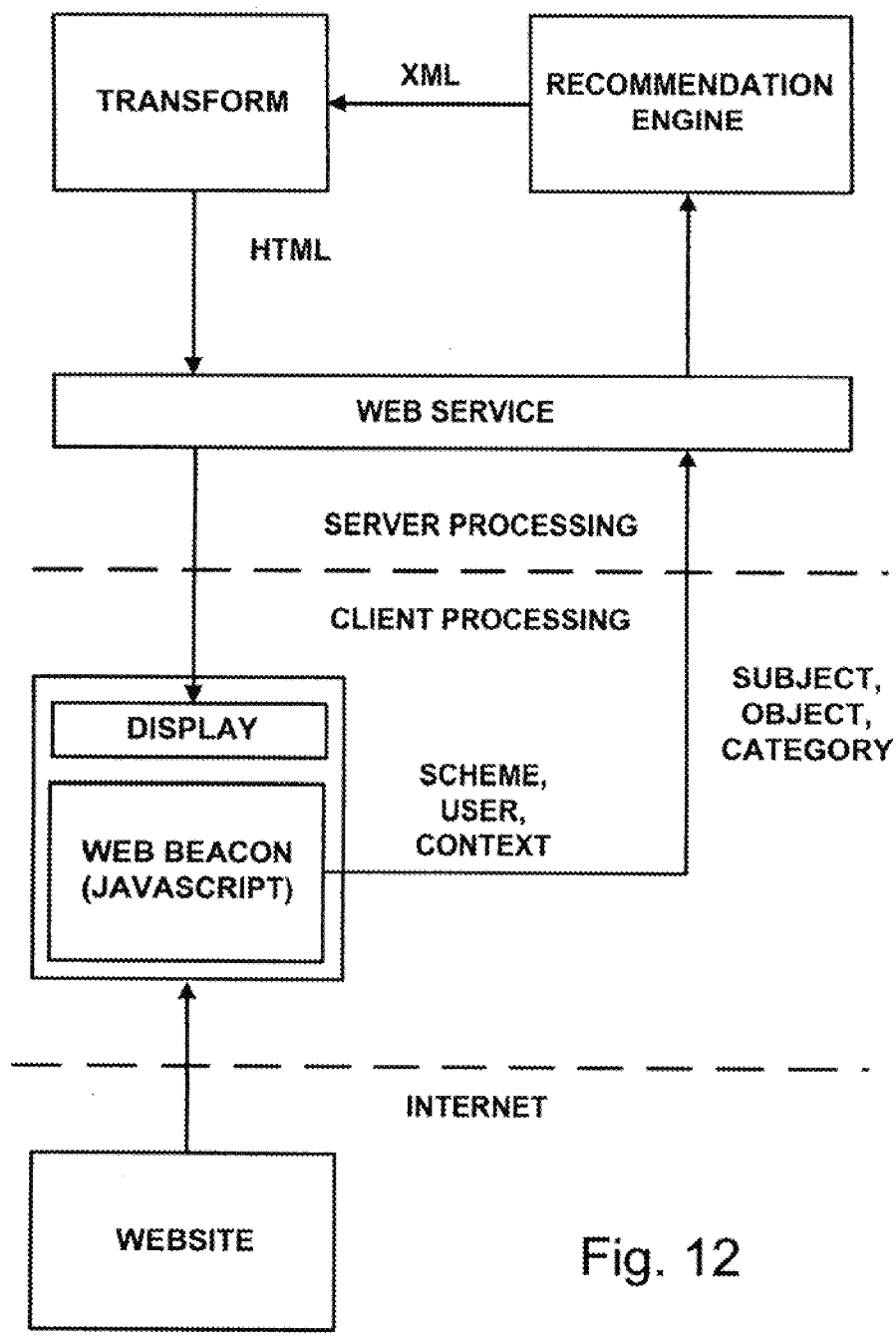
FIG. 12 shows the operation of the system to get recommendations directly from the client browser.

FIG. 12 shows the operation of the system to get recommendations directly from the client browser. The web page includes the script, or web beacon, that extracts page information and makes the recommendation request for the specific scheme, user, and context requested. These are processed by the recommendation web service, which translates the information collected from the website into the internal representation of subjects, objects, and catalog attributes. The recommendation engine performs matching and filtering based on the user and context for the specific scheme. The recommendation engine outputs the content as XML, which can then be transformed to the specific requirements of the application, typically HTML, using an XML transform, or XSLT. The content is written into the HTML page using JavaScript Object Notation (JSON), which allows the page to communicate with the server and update its contents without requiring the entire page contents to be refreshed. Alternatively, the page can be modified using an Iframe, but this technique is less flexible than JSON and is now considered obsolete, except in cases where it is necessary to interact with the user independently of the host website. Note that the entire process of requesting recommendations and rendering the resulting targeted content does not involve the website's web server in any way, other than generating the original page. This allows the recommendation service to generate dynamic content even when the website code is cached, or fixed, on a content delivery network.

Figure 13:
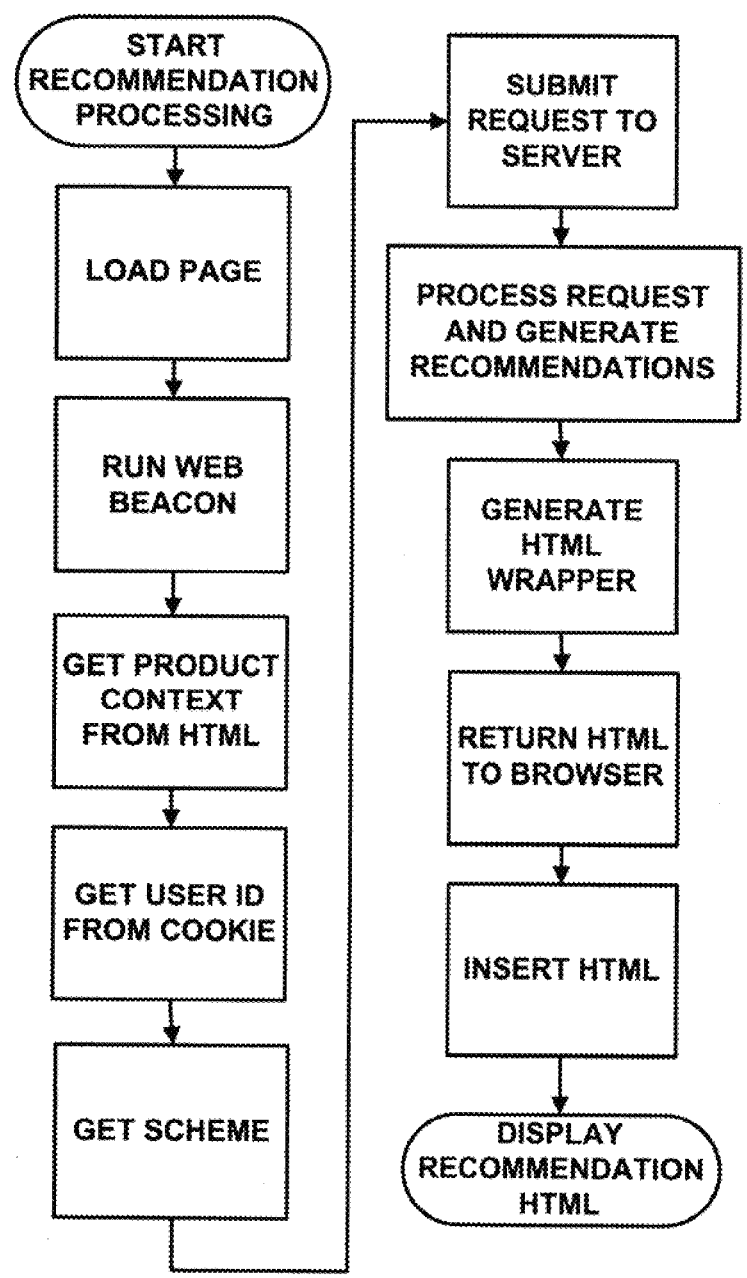
FIG. 13 shows the processing flow to get recommendations directly from the client browser.

FIG. 13 shows the processing flow to get recommendations directly from the client browser. This applies to the case where the visitor is in recommendation segment 1 as described in FIG. 11. The process starts when the website generates the page, including HTML and embedded JavaScript code, and sends it to the client browser. The client browser renders the HTML and executes the JavaScript web beacon, which extracts information about the specific content or website context, combines it with the visitor information, specifically the user ID cookie, and then submits it to the profiling and recommendation server via a web service interface. Recommendations are requested for a specific location on the page, called a scheme, whereby a page can have more than one scheme or recommendation box. Recommendations are requested by submitting the scheme, user, and context information to the web service, which decodes this information and passes it to the recommendation engine, which in turn generates the targeted content to be displayed. The web service then passes this information through a transform and passes the formatted content back to the client browser for display. The formatted HTML is inserted into the page as described in FIG. 11. Note that this direct client method is a special case of using the recommendation web service to generate dynamic recommendations. An alternative method is to call the web service from the web server rather than from the client. In this case the web server creates the display HTML and inserts it into the page before downloading to the client web browser.

Figure 14:
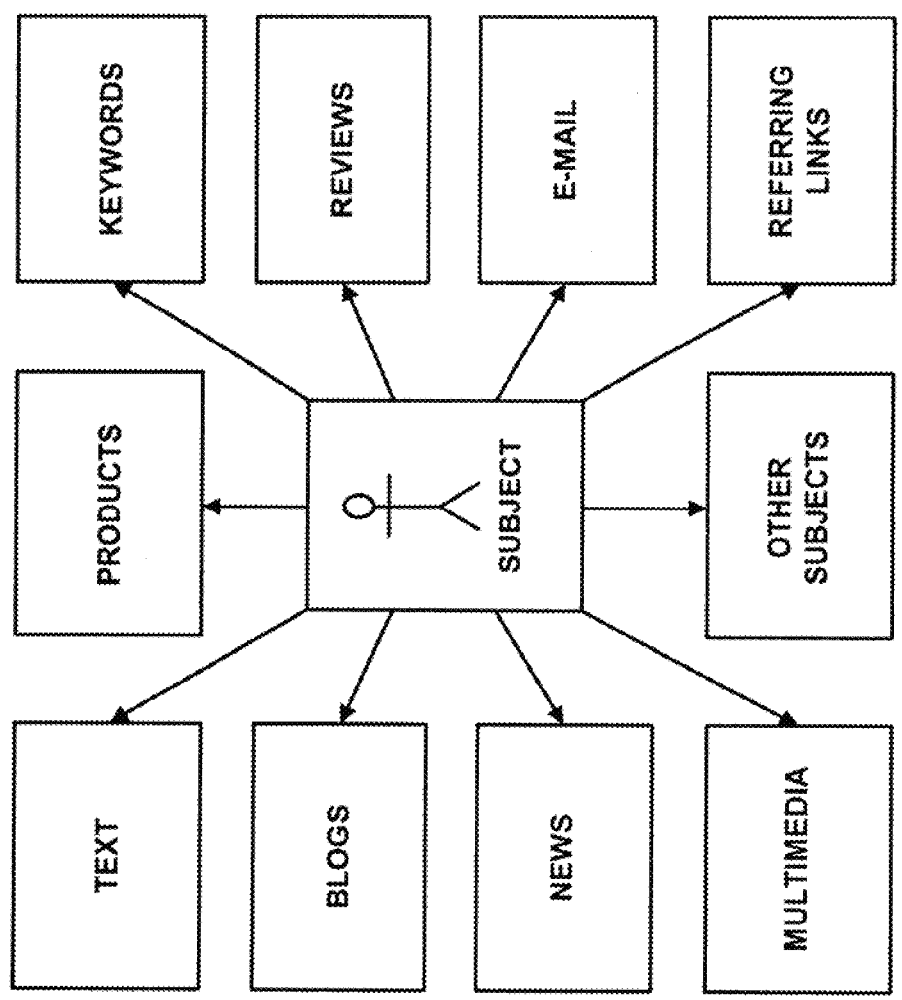
FIG. 14 shows examples of relationships between the subject and various types of individualized content and other subjects.

FIG. 14 shows examples of relationships between the subject and various types of individualized content and other subjects. As shown, the system simultaneously profiles any content that can be individually and repeatably identified by the system. Associations are created between subjects and different object types as subjects interact with multiple types of objects within a session. Once these associations are created, the profiler develops universal profiles across object types, so that any object can be matched against any subject or any other object, regardless of type.

Figure 15:
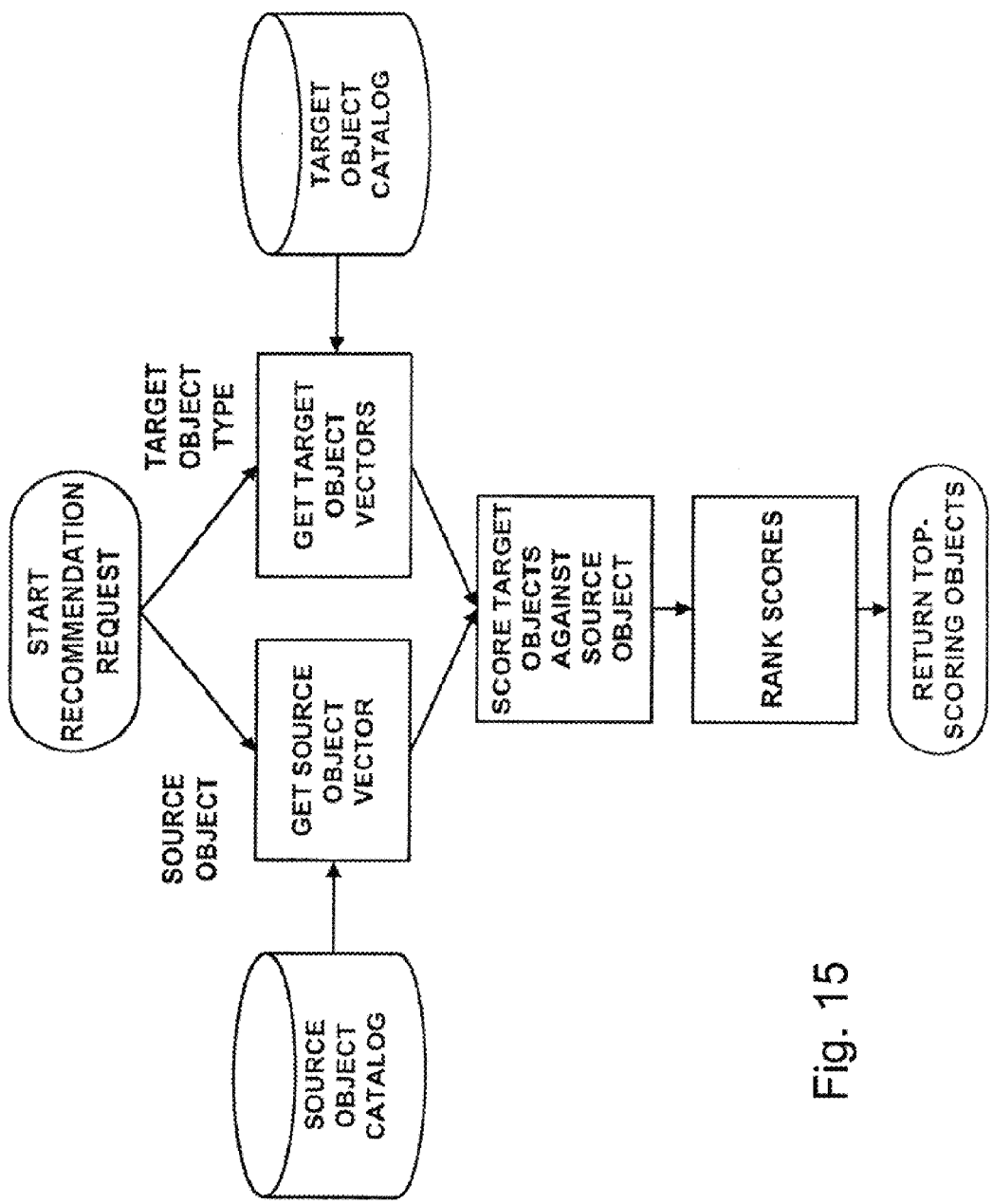
FIG. 15 shows the operation of the system to match and rank one type of object against a set of objects of another type.

FIG. 15 shows the operation of the system to match and rank one type of object against a set of objects of another type. The target objects are restricted to those that are of the type of object being requested, for example text, products, keywords, blogs, reviews, news, e-mail, multimedia, or referring, or source, links. Note that the matching and targeting can also be done using a subject as the source entity, and that the source entity, either subject or object, can be matched against any subjects as well. The recommendation request is handled as follows: First, the source object vector is retrieved from the source object catalog. Next, the set of target object vectors are retrieved from the target object catalog and matched, or scored, against the source object vector. The scored objects are ranked and the top-ranking objects are returned to the application for presentation to the user.

Figure 16:
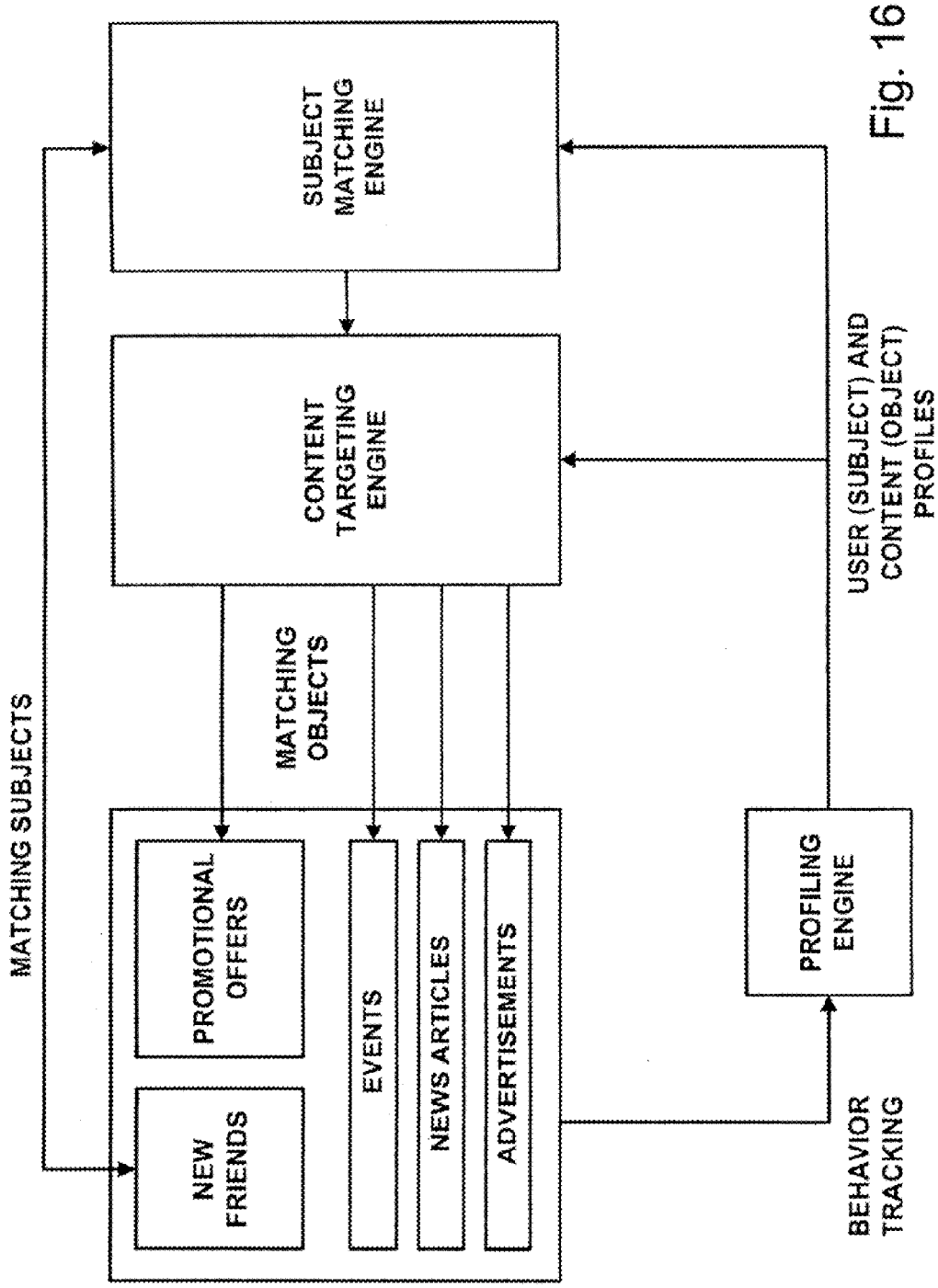
FIG. 16 shows an embodiment of a social networking site.

FIG. 16 shows an embodiment of a social networking site. The site consists of a number of elements, including, but not limited to, links to social events, news articles, advertisements, and promotional offers. The site also contains links to other users, which may be previously associated with the user or may be recommendations for new users who share interests or other characteristics with the current user. As user subjects browse the site, they interact with instances of all of these types of content, which allows the profiling engine to profile all objects from the behavior data collected from the site as described previously. The resulting subject and object profiles are then used by the content matching engine to personalize the events, news, advertisements, and offers to the personal tastes of the user. Similarly, the subject-matching engine can match the current user to other users who have browsed the site and recommend that they link up. Alternatively, the content of the site can be matched to a selected set of users, through the Circle of Friends method described previously in U.S. patent application Ser. No. 12/415,758 filed on Mar. 31, 2009 and incorporated by reference herein, the content can be personalized to the group.

Figure 17:
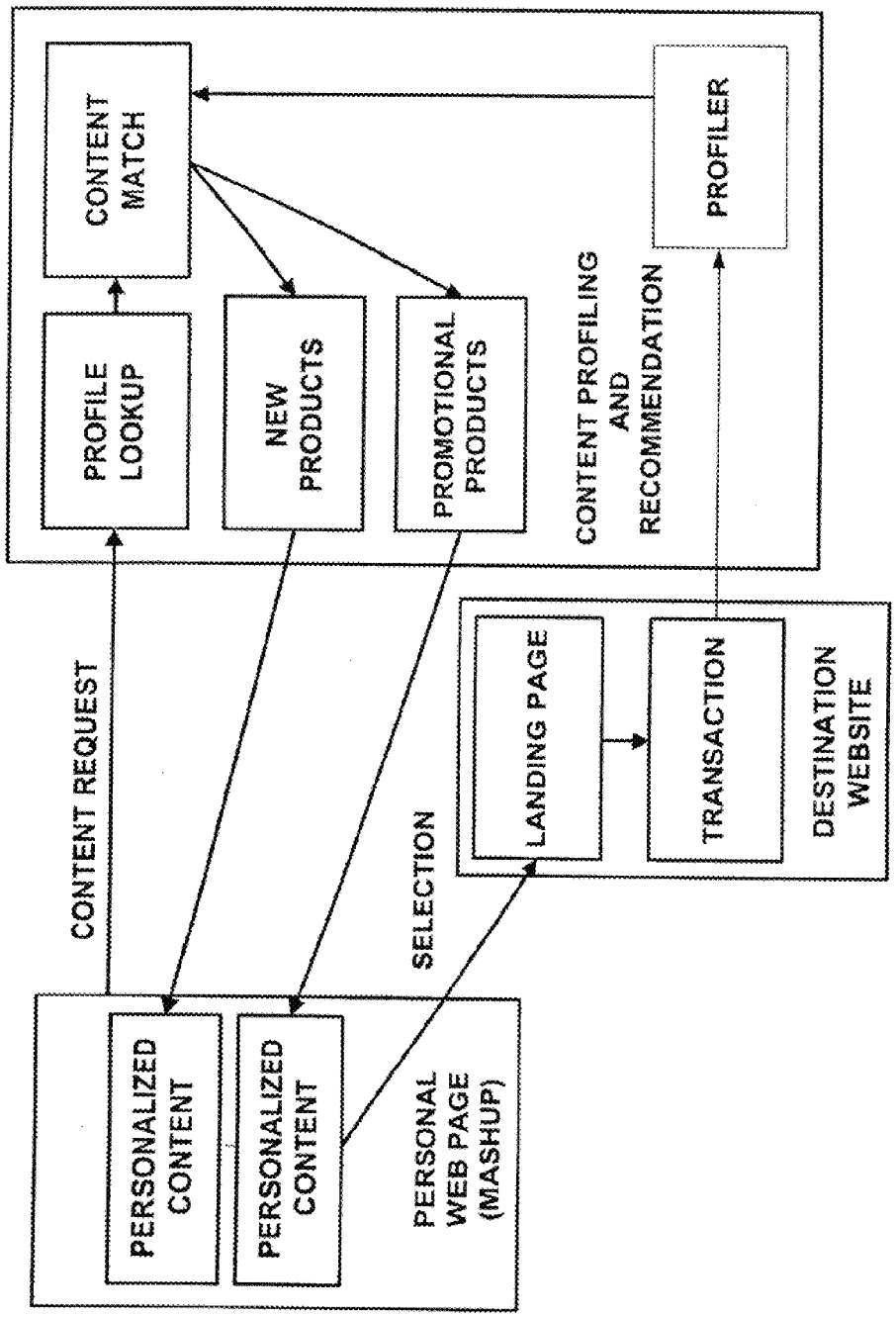
FIG. 17 shows an embodiment of personalized data feeds.

FIG. 17 shows an embodiment of personalized data feeds. A common type of data feed is really simple syndication, or RSS. In this embodiment the user subscribes to content from the destination website. Based on the user's past behavior, the content profiling and recommendation server generates content as an XML feed, which is then fed as a RSS feed to the user's personal web page. When the user selects a personalized content item from the RSS feed, then the user is taken to the destination site, where the user may interact in various ways with the selected content or other content on the destination website, including reaching a defined goal or target event. These interactions are recorded by the tracking beacon (JavaScript) and submitted to the profiler, which then updates the user's profile to generate more accurately targeted content.

Figure 18:
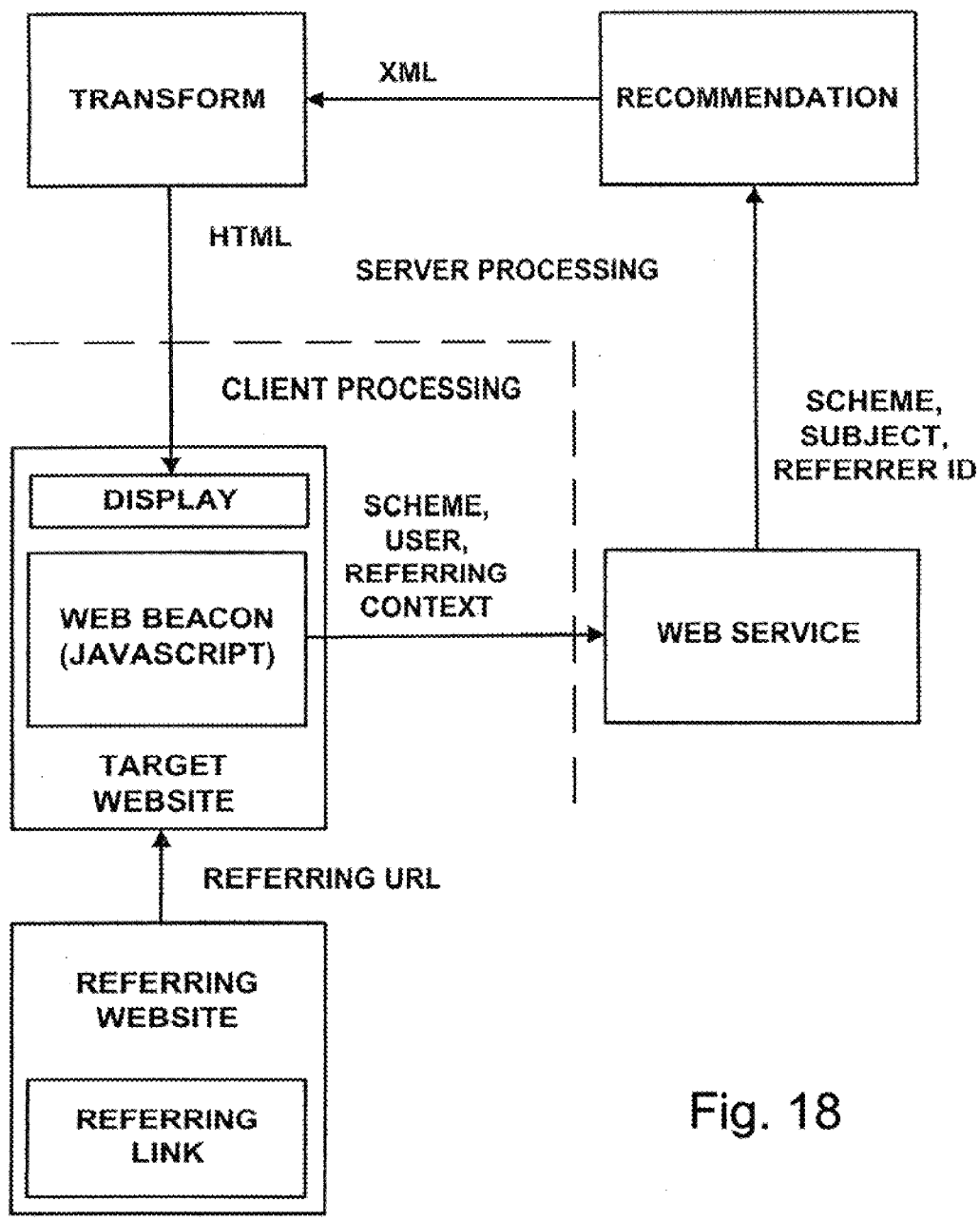
FIG. 18 shows the operation of the system to model and target source information of referring websites.

FIG. 18 shows the operation of the system to model and target source information of referring websites. This application arises when a website can be browsed to by selecting a link on an external, or referring, website, such as an affiliate marketing site, shopping comparison engine, or advertisement. In particular this allows a website to create dynamic landing pages that match the interest of new website visitors that come from the referring website. In this use of the system when the visitor comes from the referring website via a link, the web beacon captures the referring URL and submits it to the data collection web service, along with the user ID and the scheme identifier that has be been configured to generate targeted information for this application. The web service then looks up the subject ID of the website visitor and the object ID of the referring URL and requests targeted content for the configured scheme. To generate recommendations, the recommendation engine may use the subject profile or the referring object profile as the seed entity for generating recommendations, based on whether the subject or object profiles exist or one method has been measured, using simultaneous testing, to provide better results than the other. Once the recommended objects have been generated, then the results are transformed into the proper display format, typically HTML, and sent back to the client browser for display to the website visitor.

Figure 19:
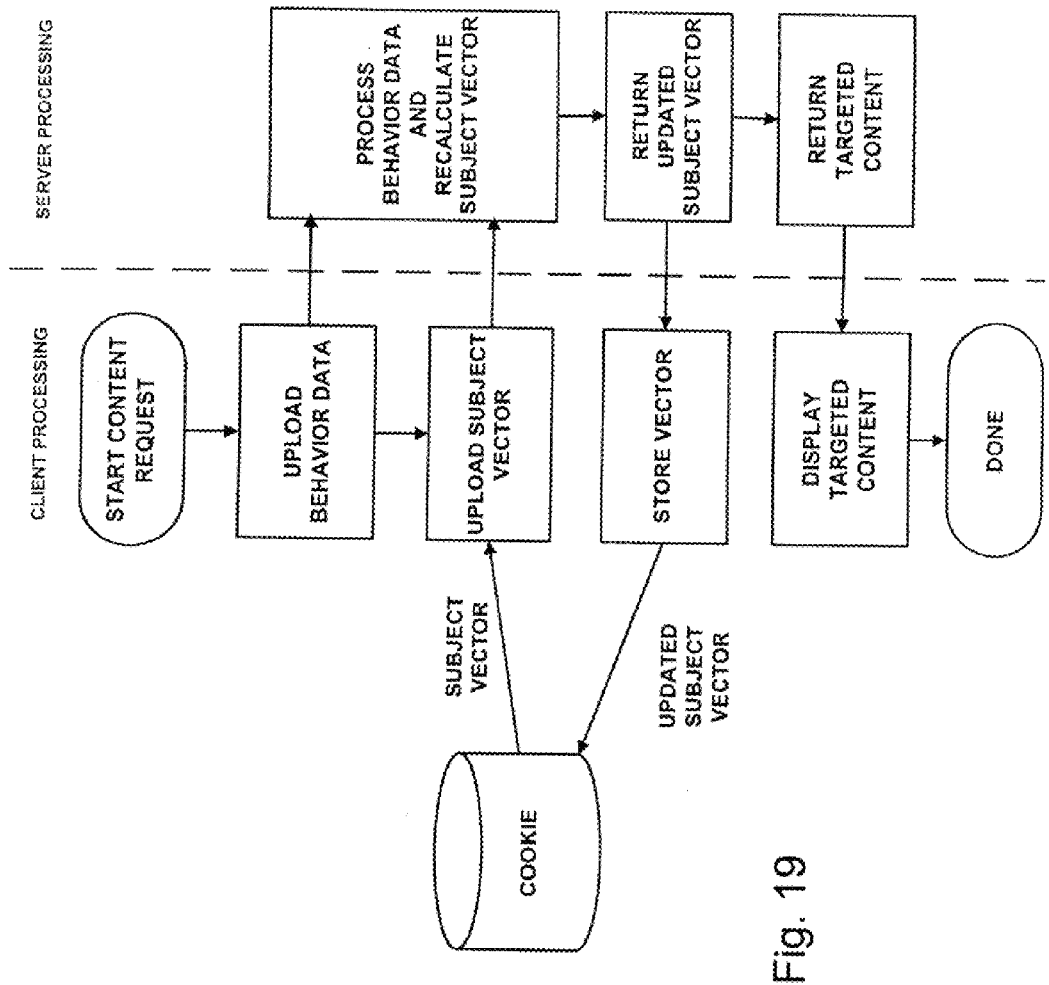
FIG. 19 shows an embodiment of the system using distributed subject profile storage.

FIG. 19 shows an embodiment of the system using distributed subject profile storage. This configuration can be used to utilize profiles across multiple websites, such as across an ad network, without requiring that data from the different sites be combined for profiling purposes. Instead, a subject's profile is stored on the subject's client browser and is applied to each website that the subject visits. This mechanism synchronizes the object profiles of each participating website, without requiring a determination of the alignment and rotation of the separate object spaces. This method also protects the privacy of the subject by retaining all subject information on the client browser, where the subject can remove it, by deleting the cookie, if desired. The profiling and targeting process works as follows: The client initiates a recommendation request when the visitor/subject visits a web page that includes the Resonance web beacon. Typically, this will be a page of any participating website that includes potential items of interest, that is objects or object links. The web beacon collects information about the visitor behavior, as described previously, and uploads the information to the data collection, profiling, and targeting server. Unlike the embodiments previously described, in this embodiment the web beacon also reads the subject profile out of the cookie and submits it to the server. The server takes the new behavior data, converts it to events and corresponding affinities and then updates the subject profile based on the new information. The subject profile is also used to generate targeted content for the subject. The updated subject profile and the targeted content are returned to the browser. The web beacon stores the updated profile in the cookie and displays the targeted content.

Figure 20:
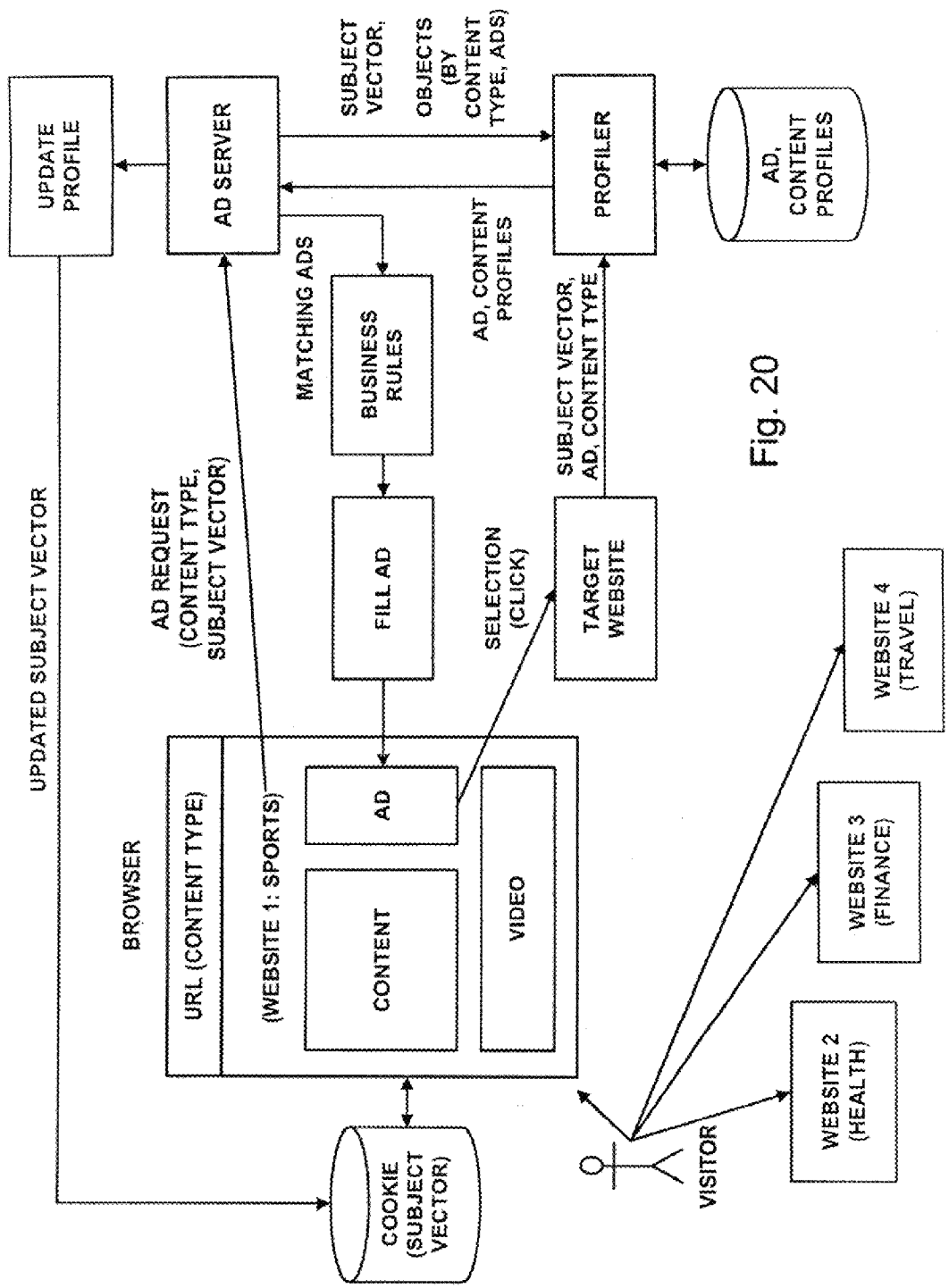
FIG. 20 shows an embodiment of targeted advertising.

FIG. 20 shows an embodiment of using the system in a targeted advertising application. This embodiment uses the distributed profiles described in FIG. 19. The ad serving system uses the invention to generate targeted advertising based on the website visitor's unique personal interests as inferred from the types of content that that visitor has browsed across the Internet, specifically those websites that participate in the ad network and hence are tracked with the web beacon. Note that while in principle each individual content item, such as news article, could be profiled and targeted, because of the sparseness of the data and limited duration of the content, it is more effective and efficient to identify the content by categorization, for example sports, health, finance, or travel, and then profile the categories. This can reduce the number of objects that need to be profiled from millions or potentially hundreds of millions to tens of thousands or less. The content type can be inferred from the URL or by explicit metatags embedded in the web page. The visitor/subject browses the Internet and looks at various websites with different kinds of content, both across different websites and within a single website. Each page of a website consists of the primary content that motivated the visitor to view the page and secondary content, such as advertisements. Either by web beacon or web service, the information about the page is collected, including the URL of the page, the content classification and links to other content options, and transmitted to the ad server. The visitor's subject profile is also read from the browser cookie and transmitted to the ad server with the page information. The ad server requests the ad and content profiles from the profiler and ranks the available ads according to the matching of the ad profiles to either the subject profile or the content profile, according to whether the subject profile is available and the configuration of the ad scheme. The ad server then applies other business rules to the ranked list, such as to meet media buying requirements or revenue optimization goals, such as by biasing the selection to a higher paying ad. The ad server then delivers the ad to the web page for viewing by the visitor. If the visitor selects the ad, as measured by a clickthrough to the destination page, then the web beacon or web service on the target website of the ad link collects the URL, ad identifier, and content type and submits it to the profiler. On both the web page where the ad is shown and the target web page, the visitor subject profiles and ad and content object vectors are updated by the profiler. The ad and content profiles are stored in the object profile database and the subject profile vector is sent back to the client browser, where it is saved in the cookie.

The above application embodiments are for example only. The invention does not restrict the design and implementation of the application in any way, as long as the interface to the recommendation engine matches the protocols defined by the interface guidelines. A key aspect of the invention is that, unlike other methods, it does not in fact require knowledge of the application and does not need to parse the application's content, other than to align the application's subjects and objects with the internal catalog in the case that the application holder desires to aggregate data with other applications.

The foregoing description of a preferred embodiment has been presented by way of example only, and should not be read in a limiting sense. The scope of the present invention is defined only by the following claims.

In the claims reference characters used to designate claim steps are provided for convenience of description only, and are not intended to imply a particular order for performing the steps.

What is claimed is:

1. A system for dynamically providing personalized data feeds for web pages, the system comprising:
   web browsers of client devices configured to:
      create unique visitor identifiers as cookies,
      extract web page information from web pages during browsing sessions on the client devices and,
      submit the web page information and recommendation requests for specific locations on the web pages via a network to a profiling server of a recommendation system external to a web server of the web pages;
      wherein the profiling server transforms the web page information into behavior events, each behavior event comprising event data, the event data comprising a unique visitor identifier and an object of a web page, wherein the profiling server collects and stores behaviors of visitors as behavior events from web browsers of the visitors to the web pages, wherein the profiling server comprises:
   an event conversion unit located on said profiling server that further converts said behavior events into a set of affinities between subjects representing visitors, objects comprising targets for behaviors of the visitors, each affinity comprising an affinity value that indicates an affinity of a subject to an object, and a weight value that indicates a certainty of the affinity value, wherein the subjects and the objects are represented in vector form and correspond to subjects and objects identified in the collected behavior events;
   a profile extraction unit located on the profiling server that:
      generates object vectors of an object vector set based on calculated object-object similarity values that indicate similarity between each object and one or more additional objects in a domain space, and wherein the object vectors are generated from object-object coincidences;
      generates subject vectors of a subject vector set based on predicted affinity values of each subject for vectors of the object vector set and wherein each subject vector is generated from subject-object affinities;

wherein the profile extraction unit is configured to generate the object vectors by progressively increasing a number of dimensions of the generated object vectors, and iteratively calculating values of the number of dimensions to minimize a residual error between calculated object-object similarity values and the collected object-object coincidences until the residual error decreases to a predetermined value;

wherein the profiling server decodes the recommendation requests and communicates the recommendation requests to a recommendation engine; and wherein the recommendation engine is configured to:
generate and format recommended content based on affinities between subjects and the objects; and
dynamically insert, during browsing sessions, the formatted recommended content into the specific locations of the web pages for display by the browsers of the client devices.

2. The system of claim 1, wherein the recommended content for a particular visitor is based on the subject vector corresponding to the particular visitor and the object vectors.

3. The system of claim 1, further comprising a cross-referencing engine for subjects and objects, to allow applications to manage the subjects and objects, while still obtaining aggregated benefit of a common database.

4. The system of claim 1, further comprising an event target model for relating the behavior of a visitor to an intended outcome of an application, wherein said event target model for relating the behavior to the intended outcome of the application includes a target model derived from probabilities or historical frequencies of a subject-object event leading to an ultimate achievement of an application target event for that subject and object, with the event weighted by the profiling server according to a probability of the subject-object event leading to the application target event.

5. The system of claim 1, wherein behavior of the visitors are collected using application scripting, which is embedded into an application which is deploying the recommended content.

6. The system of claim 5, wherein said application scripting includes application scripting which creates subject identities, randomly assigns them to test groups, including on a sampling basis, extracts subject-object events via pattern matching to application data, and displays the recommended content to the appropriate test group, either through web services or directly to the web browser or both, by employing content overwrite to generate dynamic content on the web page, including a cached web page.

7. The system of claim 1, wherein said object vector set includes an object vector generated solely from object-object coincidences whereby subject-object ratings are not required, and further wherein the object vector is generated by the profile extraction unit without negative ratings from association-only data, employing seasonal memory through variable updating and differentiating cross sells and up sells through the temporal asymmetry of antecedent consequent associations.

8. The system of claim 1, wherein said subject vector set includes a subject vector generated by combining the object vector with inferred rating levels for different levels of a target model and further wherein said inferred rating levels are estimated by rating levels predicted by matching the subject and object vectors.

9. The system of claim 1, wherein the objects in the domain space include an object profiled across types of objects and subjects and across time and category, which may be cross-associated from multiple applications or catalogs based on subjects interacting with multiple applications and catalogs, and the catalogs containing overlapping objects between applications.

10. The system of claim 9, wherein said catalogs include a catalog containing disparate types of objects.

11. The system of claim 1, further comprising assigning subjects to different test groups, and measuring their responses to recommendations, wherein testing includes generating different recommended content to different test groups based on subject profiles, including subject vectors and other subject characteristics, object profiles, including object vectors and other object characteristics, and other contextual characteristics and applied business rules thereof.

12. The system of claim 11, further comprising deploying the recommended content to subjects randomly assigned to the test groups, including a specified sampling distribution of the test groups, and displaying recommended content to an appropriate test group through the web browser by employing content overwrite to generate dynamic content on the web page, including a cached web page.

13. A method for dynamically providing personalized data feeds for web pages, the method comprising the steps of:
configuring web browsers to create unique visitor identifiers as cookies, extract web page information from web pages during browsing sessions, and submit the event data via a network to a profiling server;
transform the web page information into behavior events on the profiling server, each behavior event comprising event data, the event data comprising a unique visitor identifier and an object of the web page;
collecting and storing behaviors of visitors as behavior events from the web browsers of the visitors to the web pages on the profiling server;
further converting said behavior events by means of an event conversion unit located on the profiling server into a set of affinities between subjects representing visitors, and objects comprising targets for behaviors of the visitors, each affinity comprising an affinity value that indicates an affinity of a subject to an object, and a weight value that indicates a certainty of the affinity value;
representing subjects and objects in vector form corresponding to subjects and objects identified in the behavior events collected by the profiling server;
generating object vectors from object-object coincidences, wherein the object vectors are generated by a profile extraction unit located on the profiling server that generates each object vector of an object vector set based on calculated object-object similarity values that indicate similarity between each object and one or more additional objects in a domain space;
generating subject vectors from the subject-object affinities, wherein the subject vectors are generated by the profile extraction unit such that the profile extraction unit generates each subject vector of a subject vector set based on predicted affinity values of the subject for vectors of the object vector set;
wherein the profile extraction unit is configured to generate the object vectors by progressively increasing a number of dimensions of the generated object vectors, and iteratively calculating values of the number of dimensions to minimize a residual error between calculated object-object similarity values the collected object-object coincidences until the residual error decreases to a predetermined value;

generating and formatting recommended content based on affinities between subjects and objects; and dynamically inserting, during browsing sessions, the formatted recommended content into the specific locations of the web pages for display by the browsers.

14. The method of claim 13, wherein the recommended content for a particular visitor is based on the subject vector corresponding to the particular visitor and the object vectors.

15. The method of claim 13, further comprising managing a cross-referencing engine for subjects and objects, to allow applications to manage the subjects and objects, while still obtaining the aggregated benefit of a common database.

16. The method of claim 13, further relating a behavior of a subject to an intended outcome of an application using a target model derived from probabilities or historical frequencies of a subject-object event leading to an ultimate achievement of an application target event for that subject and object, with the event weighted by the profiling engine according to a probability of the subject-object event leading to the application target event.

17. The method of claim 13, wherein collecting behaviors of the visitors comprises collecting data employing application scripting, which is embedded into an application which is deploying the recommended content.

18. The method of claim 17, wherein said application scripting creates user subject identities, randomly assigns them to test groups, including on a sampling basis, extracts subject-object events via pattern matching to application data, and displays the recommended content to the appropriate test group, either through web services or directly to the web browser or both, by employing content overwrite to generate dynamic content on the web page, including a cached web page.

19. The method of claim 13, wherein said object vectors include object vectors generated solely from object-object coincidences whereby subject-object ratings are not required, and further wherein the object vectors are generated by the profile extraction unit without negative ratings from association-only data, employing seasonal memory through variable updating and differentiating cross sells and up sells through the temporal asymmetry of antecedent consequent associations.

20. The method of claim 13, wherein said subject vectors include subject vectors generated by combining the object vectors with inferred rating levels for different levels of a target model and further wherein said inferred rating levels are estimated by rating levels predicted by matching subject and object vectors.

21. The method of claim 13, wherein said objects include objects profiled across types of objects and subjects and across time and category, which may be cross-associated from multiple applications or catalogs based on subjects interacting with multiple applications and catalogs, and the catalogs containing overlapping objects between applications.

22. The method of claim 21, wherein said catalogs include a catalog containing disparate types of objects.

23. The method of claim 13, further comprising assigning subjects to different test groups, and measuring their responses to the recommended content, wherein measuring includes generating different recommended content to different test groups based on subject profiles, including the subject vectors and other subject characteristics, object profiles, including the object vectors and other object characteristics, and other contextual characteristics and applied business rules thereof.

24. The method of claim 23 deploying the recommended content to subjects randomly assigned to test groups, including a specified sampling distribution of the test groups, and displaying the recommended content to the appropriate test group through the web browsers by employing content overwrite to generate dynamic content on web pages, including cached web pages.

* * * * *